US011862097B2

(12) United States Patent
Lee et al.

(10) Patent No.: US 11,862,097 B2
(45) Date of Patent: Jan. 2, 2024

(54) DISPLAY DEVICE AND METHOD OF PERFORMING AN OVER-CURRENT PROTECTING OPERATION THEREOF

(71) Applicant: Samsung Display Co., Ltd., Yongin-Si (KR)

(72) Inventors: Sanghyun Lee, Seongnam-si (KR); Dae-Sik Lee, Hwaseong-si (KR); Keunoh Kang, Uijeongbu-si (KR); Siduk Sung, Hwaseong-si (KR); Songyi Han, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/087,902

(22) Filed: Dec. 23, 2022

(65) Prior Publication Data

US 2023/0317013 A1 Oct. 5, 2023

(30) Foreign Application Priority Data

Apr. 1, 2022 (KR) ........................ 10-2022-0040985

(51) Int. Cl.
*G09G 3/3258* (2016.01)
*G09G 3/00* (2006.01)

(52) U.S. Cl.
CPC ........... *G09G 3/3258* (2013.01); *G09G 3/006* (2013.01); *G09G 2330/021* (2013.01);
(Continued)

(58) Field of Classification Search
CPC .. G09G 3/3258; G09G 3/006; G09G 2330/04; G09G 2330/021; G09G 2330/045; G09G 2330/12
(Continued)

(56) References Cited

U.S. PATENT DOCUMENTS

2005/0116657 A1* 6/2005 Park ........................ G09G 3/22 315/300
2016/0189599 A1* 6/2016 Lee ........................ H05B 47/00 345/76

(Continued)

FOREIGN PATENT DOCUMENTS

KR 10-2006-0109137 A 10/2006
KR 10-2117341 B1 6/2020
KR 10-2021-0016835 A 2/2021

*Primary Examiner* — Tom V Sheng
(74) *Attorney, Agent, or Firm* — Innovation Counsel LLP

(57) ABSTRACT

A display device includes a display panel including a pixel circuit, a display panel driving circuit that drives the display panel, a voltage generating circuit that receives an input power supply voltage when the display device is powered on and generates display panel voltages and driving circuit voltages based on the input power supply voltage, and an over-current protecting circuit that monitors an over-current generated inside the display device and generates a shut-down request signal when the over-current is detected. The voltage generating circuit outputs an initialization voltage at a first time point corresponding to a time point at which the input power supply voltage is received. The display panel driving circuit outputs a scan clock signal at a second time point. The over-current protecting circuit performs a first over-current protecting operation in a power-on monitoring period set between the first time point and the second time point.

25 Claims, 13 Drawing Sheets

(52) U.S. Cl.
CPC ... *G09G 2330/04* (2013.01); *G09G 2330/045* (2013.01); *G09G 2330/12* (2013.01)

(58) Field of Classification Search
USPC ............................................................ 345/87
See application file for complete search history.

(56) References Cited

U.S. PATENT DOCUMENTS

| | | | | |
|---|---|---|---|---|
| 2017/0004773 | A1* | 1/2017 | Kim | G09G 3/3258 345/691 |
| 2017/0256222 | A1* | 9/2017 | Kuo | G09G 3/3677 |
| 2019/0278114 | A1* | 9/2019 | Lee | G02F 1/13452 |
| 2020/0020265 | A1* | 1/2020 | Lee | G09G 3/20 |
| 2020/0074930 | A1* | 3/2020 | Lee | G09G 3/3233 |
| 2020/0152125 | A1* | 5/2020 | Ye | G09G 3/3233 |
| 2023/0129192 | A1* | 4/2023 | In | G09G 3/32 324/537 |
| 2023/0186829 | A1* | 6/2023 | Lee | G09G 3/2096 345/214 |
| 2023/0230514 | A1* | 7/2023 | Nam | G09G 3/3225 345/204 |

* cited by examiner

DISPLAY DEVICE AND METHOD OF PERFORMING AN OVER-CURRENT PROTECTING OPERATION THEREOF

CROSS-REFERENCE TO RELATED APPLICATION

This application claims priority under 35 USC § 119 to Korean Patent Application No. 10-2022-0040985 filed on Apr. 1, 2022, in the Korean Intellectual Property Office (KIPO), the entire disclosure of which is incorporated herein by reference.

BACKGROUND

1. Field

Embodiments relate generally to a display device. More particularly, embodiments relate to a display device capable of protecting internal circuits when an over-current is detected inside the display device and a method of performing an over-current protecting operation thereof.

2. Description of the Related Art

In general, a display device may include a display panel including a pixel circuit, a display panel driving circuit configured to drive the display panel, and a voltage generating circuit configured to generate display panel voltages (e.g., a high power supply voltage, a low power supply voltage, an initialization voltage, etc.) for driving the display panel and driving circuit voltages (e.g., a gate-on voltage, a gate-off voltage, an analog power supply voltage, a gamma voltage, etc.) for driving the display panel driving circuit based on an input power supply voltage.

Here, the display panel voltages and the driving circuit voltages may be provided to the display panel and the display panel driving circuit through voltage lines (or voltage wires), in which an over-current may flow through the voltage lines when a short-circuit defect occurs between the voltage lines, or a burnt defect occurs due to a foreign substance and the like within the display device. Due to the over-current, the display device may be gradually damaged to cause an abnormal operation of the display device, and may eventually cause serious product liability (PL) accidents such as an explosion or a fire.

In order to solve such problems, a conventional display device includes an over-current protecting circuit configured to monitor an over-current generated inside the display device, and shut down internal circuits to protect the internal circuits when the over-current is detected. There is a limitation in detecting whether an initialization voltage current caused by an initialization voltage for initializing an initialization target node (e.g., an anode of a light emitting element, etc.) within a pixel circuit included in the display device (e.g., an organic light emitting display device, etc.) is the over-current.

SUMMARY

An object of the present disclosure is to provide a display device capable of outputting an initialization voltage for initializing an initialization target node in a pixel circuit (i.e., a first time point) before outputting a scan clock signal for generating a scan signal that is to be applied to the pixel circuit in a power-on sequence period (i.e., a second time point), and detecting a minute over-current (e.g., due to a burnt defect, etc.) caused by the initialization voltage under a relatively low reference current condition in a power-on monitoring period that is set between the first time point and the second time point.

Another object of the present disclosure is to provide a method of performing an over-current protecting operation of the display device.

According to embodiments, a display device may include a display panel including a pixel circuit, a display panel driving circuit configured to drive the display panel, a voltage generating circuit configured to receive an input power supply voltage when the display device is powered on, and generate display panel voltages for driving the display panel and driving circuit voltages for driving the display panel driving circuit based on the input power supply voltage, and an over-current protecting circuit configured to monitor an over-current generated inside the display device, and generate a shut-down request signal for shutting down at least one of the display panel, the display panel driving circuit, and the voltage generating circuit when the over-current is detected. Here, the voltage generating circuit may output (i.e., start outputting) an initialization voltage for initializing an initialization target node in the pixel circuit at a first time point corresponding to a time point at which the input power supply voltage is received, the display panel driving circuit may output (i.e., start outputting) a scan clock signal for generating a scan signal that is to be applied to the pixel circuit at a second time point that is later than the first time point, and the over-current protecting circuit may perform a first over-current protecting operation of detecting whether an initialization voltage current caused by the initialization voltage is the over-current in a power-on monitoring period that is set between the first time point and the second time point.

In embodiments, the initialization target node may correspond to an anode of a light emitting element connected to the pixel circuit.

In embodiments, the power-on monitoring period may be set as an entire period between the first time point and the second time point.

In embodiments, the power-on monitoring period may be set as a partial period between the first time point and the second time point.

In embodiments, in the power-on monitoring period, the over-current protecting circuit may generate the shut-down request signal when a state in which the initialization voltage current is greater than a first reference current continues for a first reference time.

In embodiments, when a display operation of displaying an image on the display panel is performed, the over-current protecting circuit may perform a second over-current protecting operation of detecting whether the initialization voltage current is the over-current in an initialization operation period of the pixel circuit during which the initialization voltage is applied to the initialization target node.

In embodiments, in the initialization operation period, the over-current protecting circuit may generate the shut-down request signal when a state in which the initialization voltage current is greater than a second reference current continues for a second reference time.

In embodiments, the first reference current may be set to be smaller than the second reference current.

In embodiments, the first reference current, the second reference current, the first reference time, and the second reference time may be adjustable.

According to embodiments, a display device may include a display panel including a pixel circuit, a display panel driving circuit configured to drive the display panel, a voltage generating circuit configured to receive an input power supply voltage when the display device is powered on, and generate display panel voltages for driving the display panel and driving circuit voltages for driving the display panel driving circuit based on the input power supply voltage, and an over-current protecting circuit configured to monitor an over-current generated inside the display device, and generate a shut-down request signal for shutting down at least one of the display panel, the display panel driving circuit, and the voltage generating circuit when the over-current is detected. Here, the voltage generating circuit may output (i.e., start outputting) an initialization voltage for initializing an initialization target node in the pixel circuit at a first time point that is later than a time point at which the input power supply voltage is received, the display panel driving circuit may output (i.e., start outputting) a scan clock signal for generating a scan signal that is to be applied to the pixel circuit at a second time point that is later than the first time point, and the over-current protecting circuit may perform a first over-current protecting operation of detecting whether an initialization voltage current caused by the initialization voltage is the over-current in a power-on monitoring period that is set between the first time point and the second time point.

In embodiments, the initialization target node may correspond to an anode of a light emitting element connected to the pixel circuit.

In embodiments, the power-on monitoring period may be set as an entire period between the first time point and the second time point.

In embodiments, the power-on monitoring period may be set as a partial period between the first time point and the second time point.

In embodiments, in the power-on monitoring period, the over-current protecting circuit may generate the shut-down request signal when a state in which the initialization voltage current is greater than a first reference current continues for a first reference time.

In embodiments, when a display operation of displaying an image on the display panel is performed, the over-current protecting circuit may perform a second over-current protecting operation of detecting whether the initialization voltage current is the over-current in an initialization operation period of the pixel circuit during which the initialization voltage is applied to the initialization target node.

In embodiments, in the initialization operation period, the over-current protecting circuit may generate the shut-down request signal when a state in which the initialization voltage current is greater than a second reference current continues for a second reference time.

In embodiments, the first reference current may be set to be smaller than the second reference current.

In embodiments, the first reference current, the second reference current, the first reference time, and the second reference time may be adjustable.

According to embodiments, a method of performing an over-current protecting operation of a display device may include receiving an input power supply voltage when the display device is powered on, generating and outputting an initialization voltage for initializing an initialization target node within a pixel circuit based on the input power supply voltage, performing a first over-current protecting operation of detecting whether an initialization voltage current caused by the initialization voltage is an over-current in a power-on monitoring period that is set between a first time point at which the initialization voltage is output (i.e., starts to be output) and a second time point at which a scan clock signal for generating a scan signal that is to be applied to the pixel circuit is output (i.e., starts to be output), and shutting down the display device when the initialization voltage current is determined as the over-current in the power-on monitoring period.

In embodiments, the initialization target node may correspond to an anode of a light emitting element connected to the pixel circuit.

In embodiments, the method may further include applying the initialization voltage to the initialization target node in an initialization operation period of the pixel circuit after the second time point, performing a second over-current protecting operation of detecting whether the initialization voltage current is the over-current in the initialization operation period, and shutting down the display device when the initialization voltage current is determined as the over-current in the initialization operation period.

In embodiments, performing the first over-current protecting operation include may include monitoring the initialization voltage current, determining whether a first state in which the initialization voltage current is greater than a first reference current continues for a first reference time, and determining the initialization voltage current as the over-current when the first state continues for the first reference time.

In embodiments, performing the second over-current protecting operation may include monitoring the initialization voltage current, determining whether a second state in which the initialization voltage current is greater than a second reference current continues for a second reference time, and determining the initialization voltage current as the over-current when the second state continues for the second reference time.

In embodiments, the first reference current may be set to be smaller than the second reference current.

In embodiments, the first reference current, the second reference current, the first reference time, and the second reference time may be adjustable.

Therefore, a display device according to embodiments may include a display panel including a pixel circuit, a display panel driving circuit configured to drive the display panel, a voltage generating circuit configured to receive an input power supply voltage when the display device is powered on, and generate display panel voltages for driving the display panel and driving circuit voltages for driving the display panel driving circuit based on the input power supply voltage, and an over-current protecting circuit configured to monitor an over-current generated inside the display device, and generate a shut-down request signal for shutting down at least one of the display panel, the display panel driving circuit, and the voltage generating circuit when the over-current is detected. Here, the voltage generating circuit may output an initialization voltage for initializing an initialization target node in the pixel circuit at a first time point corresponding to a time point at which the input power supply voltage is received or a time point that is later than the time point at which the input power supply voltage is received by a predetermined time, the display panel driving circuit may output a scan clock signal for generating a scan signal that is to be applied to the pixel circuit at a second time point that is later than the first time point, and the over-current protecting circuit may perform a first over-current protecting operation of detecting whether an initialization voltage current caused by the initialization voltage is the over-current in a power-on monitoring period that is set between the first time point and the second time point. Thus, the display device may detect a minute over-current (e.g., due to a burnt defect, etc.) caused by the initialization voltage under a relatively low reference current condition in the power-on monitoring period.

Accordingly, the display device may prevent an explosion, a fire, and the like, which have been caused as a burnt defect and the like grow (e.g., although a conventional display device may additionally perform a black gray level over-current protecting operation of detecting an over-current by using a fact that an initialization voltage current has to be close to zero when a black gray level image is displayed on a display panel, the burnt defect and the like may continuously grow until the black gray level image is displayed on the display panel) in a case where the conventional display device fails to detect a minute over-current (e.g., due to a burnt defect, etc.) caused by an initialization voltage in a power-on sequence period.

In addition, the display device may allow the over-current protecting circuit to perform a second over-current protecting operation of detecting whether the initialization voltage current caused by the initialization voltage is the over-current in an initialization operation period of the pixel circuit during which the initialization voltage is applied to the initialization target node in the pixel circuit when a display operation of displaying an image on the display panel is performed, so that the over-current (e.g., due to a short-circuit defect, etc.) caused by the initialization voltage can be detected without an error under a relatively high reference current condition in the initialization operation period.

A method of performing an over-current protecting operation of a display device according to embodiments may include receiving an input power supply voltage when the display device is powered on, generating and outputting an initialization voltage for initializing an initialization target node in a pixel circuit based on the input power supply voltage, and performing a first over-current protecting operation of detecting whether an initialization voltage current caused by the initialization voltage is an over-current in a power-on monitoring period that is set between a first time point at which the initialization voltage is output and a second time point at which a scan clock signal for generating a scan signal that is to be applied to the pixel circuit is output, so that a minute over-current (e.g., due to a burnt defect, etc.) caused by the initialization voltage can be detected under a relatively low reference current condition in the power-on monitoring period.

In addition, the method of performing the over-current protecting operation of the display device may include applying the initialization voltage to the initialization target node in the pixel circuit in an initialization operation period of the pixel circuit after the second time point at which the scan clock signal for generating the scan signal that is to be applied to the pixel circuit is output and performing a second over-current protecting operation of detecting whether the initialization voltage current caused by the initialization voltage is the over-current in the initialization operation period, so that the over-current (e.g., due to a short-circuit defect, etc.) caused by the initialization voltage can be detected without an error under a relatively high reference current condition in the initialization operation period.

DETAILED DESCRIPTION OF THE EMBODIMENTS

Hereinafter, embodiments of the present disclosure will be explained in detail with reference to the accompanying drawings.

Figure 1:
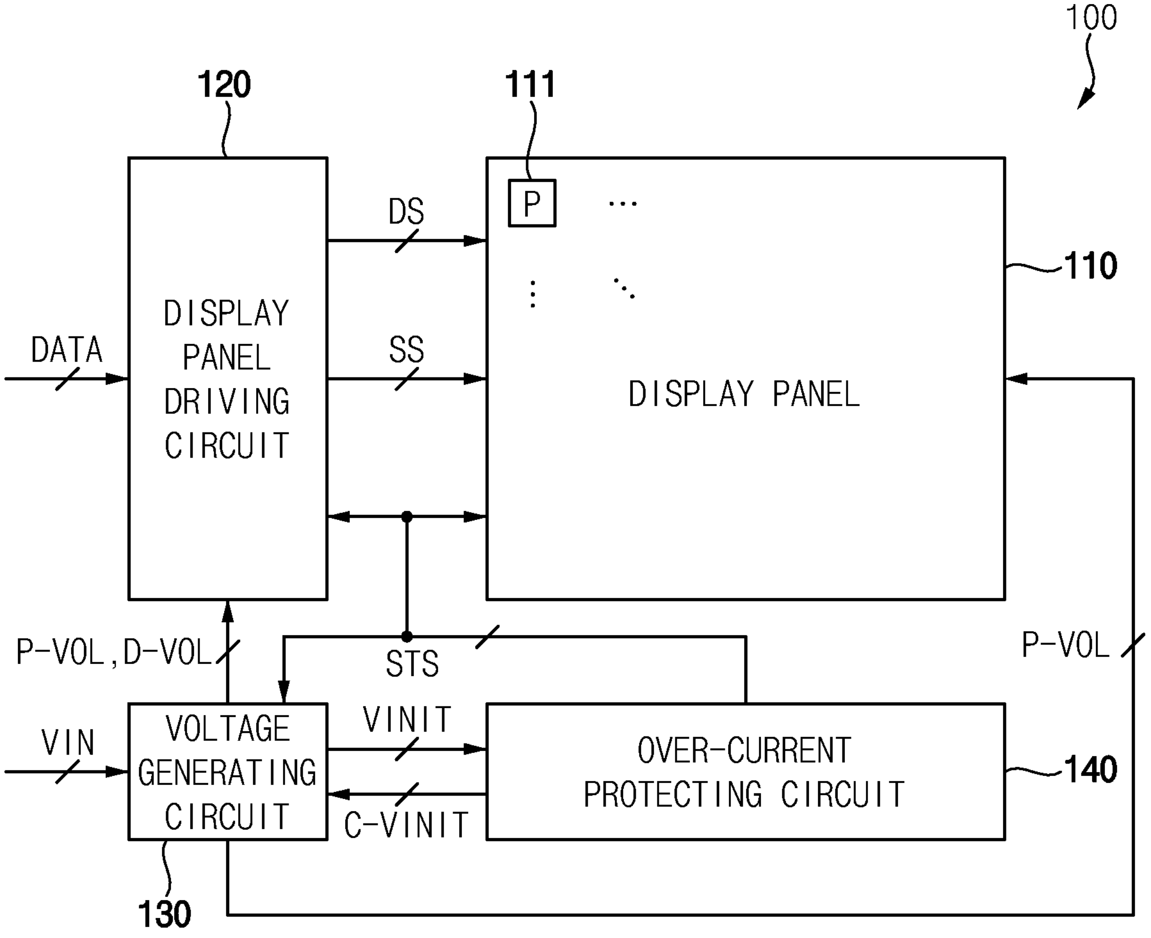
FIG. 1 is a block diagram illustrating a display device according to embodiments.
Figure 2:
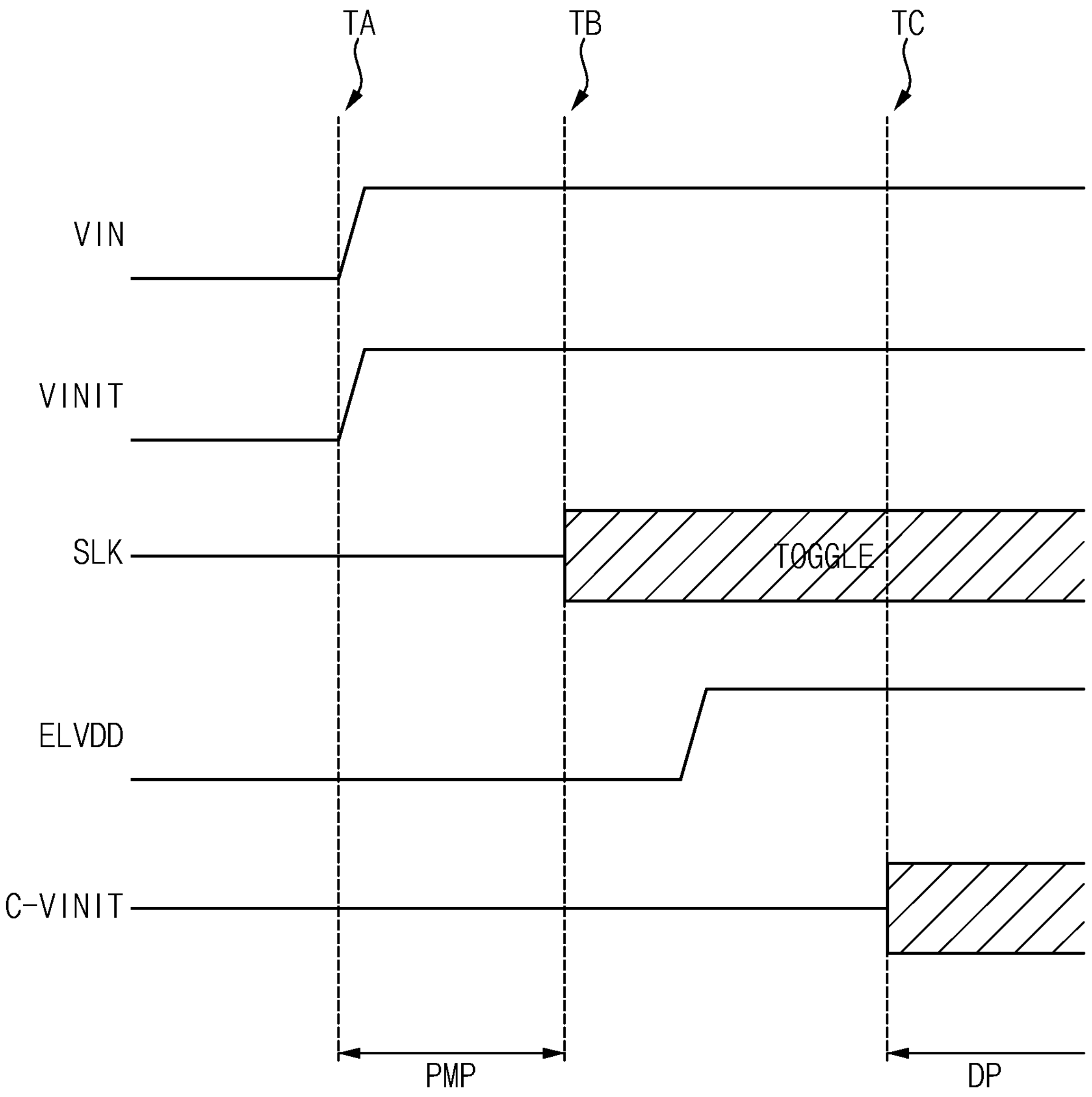
FIG. 2 is a timing diagram illustrating an example in which the display device of FIG. 1 operates in a power-on sequence period.
Figure 3:
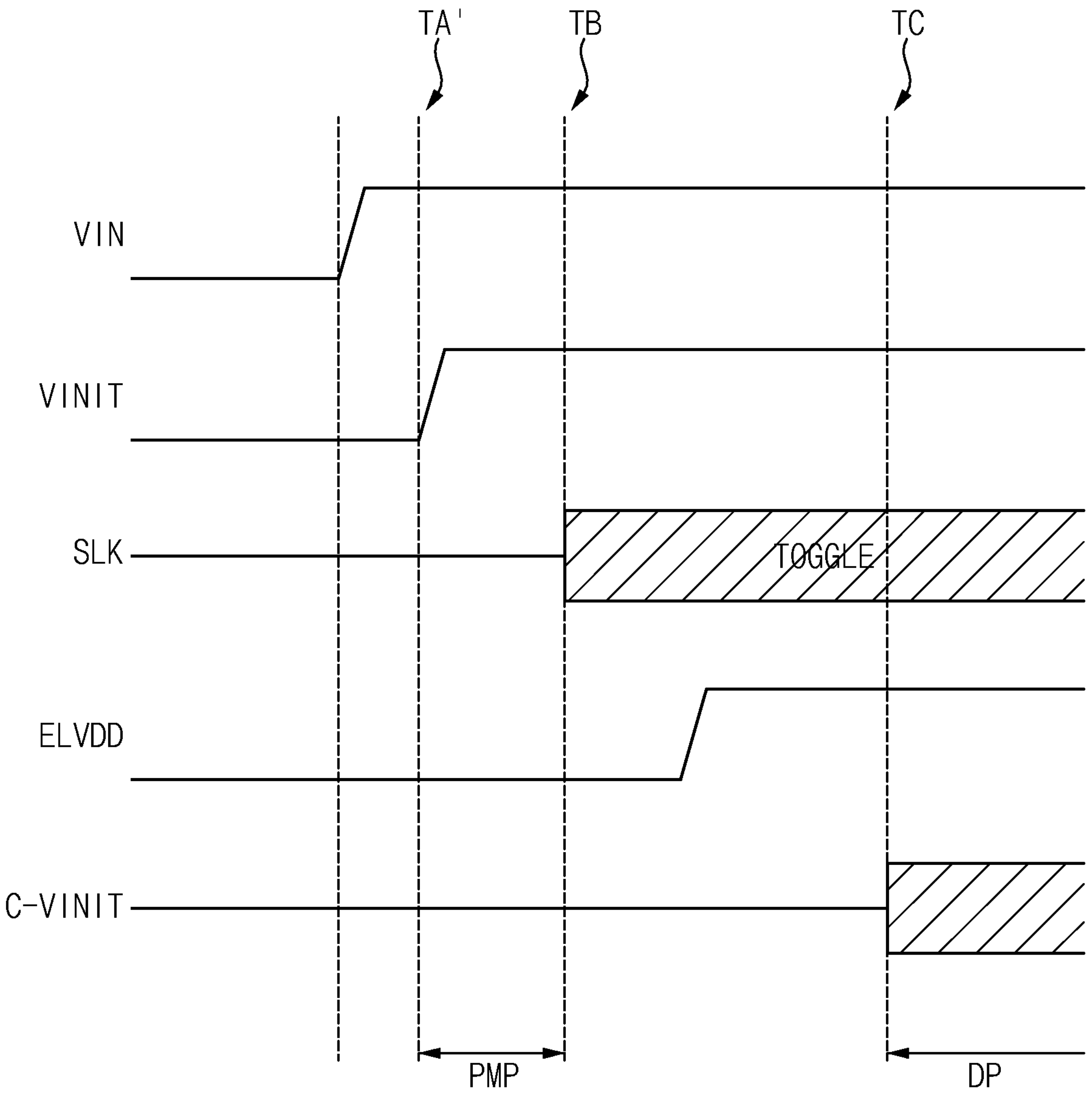
FIG. 3 is a timing diagram illustrating another example in which the display device of FIG. 1 operates in a power-on sequence period.

FIG. 1 is a block diagram illustrating a display device according to embodiments, FIG. 2 is a timing diagram illustrating an example in which the display device of FIG. 1 operates in a power-on sequence period, and FIG. 3 is a timing diagram illustrating another example in which the display device of FIG. 1 operates in a power-on sequence period.

Referring to FIGS. 1 to 3, a display device 100 may include a display panel 110, a display panel driving circuit 120, a voltage generating circuit 130, and an over-current protecting circuit 140. Here, the display device 100 may be an organic light emitting display device, but the display device 100 is not limited thereto.

The display panel 110 may include a plurality of pixels each of which includes a pixel circuit 111 and a light emitting element connected to the pixel circuit 111. Here, a plurality of pixels may be arranged in various forms (e.g., a matrix form, etc.) within the display panel 110. The pixel circuit 111 may be connected to a data driving circuit through a data line, connected to a scan driving circuit through a scan line, and connected to an initialization voltage generating circuit included in the voltage generating circuit 130 through an initialization voltage line. In an embodiment, the pixel circuit 111 may include at least three transistors (e.g., a switching transistor, a driving transistor, and an initialization transistor) and at least one capacitor (e.g., a storage capacitor). A light emitting element (e.g., an organic light emitting diode) may be connected to the pixel circuit 111.

The display panel driving circuit 120 may drive the display panel 110. To this end, the display panel driving circuit 120 may include a data driving circuit (or referred to as a data driver) configured to provide a data signal DS to the display panel 110 through a data line, a scan driving circuit (or referred to as a scan driver) configured to provide a scan signal SS to the display panel 110 through a scan line, a timing control circuit (or referred to as a timing controller) configured to control the data driving circuit and the scan driving circuit, and the like. Meanwhile, the display panel driving circuit 120 may receive display panel voltages P-VOL from the voltage generating circuit 130 to drive the display panel 110. For example, the display panel voltages P-VOL may include a high power supply voltage ELVDD, a low power supply voltage ELVSS, an initialization voltage VINIT, and the like.

The data driving circuit may generate the data signal DS to be provided to the display panel 110 based on a data control signal and image data DATA received from the timing control circuit. Here, the data control signal may include a horizontal start signal and a load signal, but the data control signal is not limited thereto. In an embodiment, the data driving circuit may be implemented as at least one integrated circuit (IC). For example, the data driving circuit may be configured as at least one driving chip mounted on a flexible printed circuit board and connected to the display panel 110 in a tape carrier package (TCP) scheme, or mounted on the display panel 110 in a chip-on-glass (COG) scheme. However, since the above configuration has been provided for illustrative purposes, an implementation scheme of the data driving circuit is not limited thereto.

The scan driving circuit may generate the scan signal SS to be provided to the display panel 110 based on a scan control signal received from the timing control circuit. Here, the scan control signal may include a vertical start signal and a scan clock signal SLK, but the scan control signal is not limited thereto. To this end, the scan driving circuit may include shift registers configured to generate the scan signal SS based on the vertical start signal (or a scan start signal generated by level-shifting the vertical start signal) and the scan clock signal SLK. In an embodiment, the scan driving circuit may be implemented as at least one integrated circuit. For example, the scan driving circuit may be configured as at least one driving chip mounted on a flexible printed circuit board and connected to the display panel 110 in a tape carrier package scheme, or mounted on the display panel 110 in a chip-on-glass scheme. As another example, the scan driving circuit may be formed simultaneously with the transistors of the pixel circuit in a non-display area (i.e., a peripheral area) of the display panel 110 in a form of an amorphous silicon TFT gate driver circuit (ASG) or an oxide silicon TFT gate driver circuit (OSG). In this case, transistors of the scan driving circuit may include an amorphous silicon thin film transistor or an oxide thin film transistor. However, since the above configuration has been provided for illustrative purposes, an implementation scheme of the scan driving circuit is not limited thereto.

The timing control circuit (e.g., a microcontroller unit (MCU), etc.) may control the data driving circuit and the data driving circuit. To this end, the timing control circuit may generate various signals (e.g., the data control signal, the scan control signal, etc.) for controlling the data driving circuit and the scan driving circuit by using driving circuit voltages D-VOL supplied from the voltage generating circuit 130. For example, the driving circuit voltages D-VOL may include a gate-on voltage, a gate-off voltage, an analog power supply voltage, a gamma voltage, and the like. In some embodiments, the timing control circuit may receive the image data DATA from an outside, perform predetermined processing (e.g., data compensation processing, etc.), and provide the image data DATA that has been performed the predetermined processing to the data driving circuit.

The voltage generating circuit 130 may receive an input power supply voltage VIN when the display device 100 is powered on, and generate display panel voltages P-VOL for driving the display panel 110 and driving circuit voltages D-VOL for driving the display panel driving circuit 120 based on the input power supply voltage VIN. In other words, the voltage generating circuit 130 may generate and output the display panel voltages P-VOL and the driving circuit voltages D-VOL in a power-on sequence period of the display device 100 (i.e., a period during which voltages and signals required to display an image on the display panel 110 are sequentially generated and output after the display device 100 is powered on).

Figure 6:
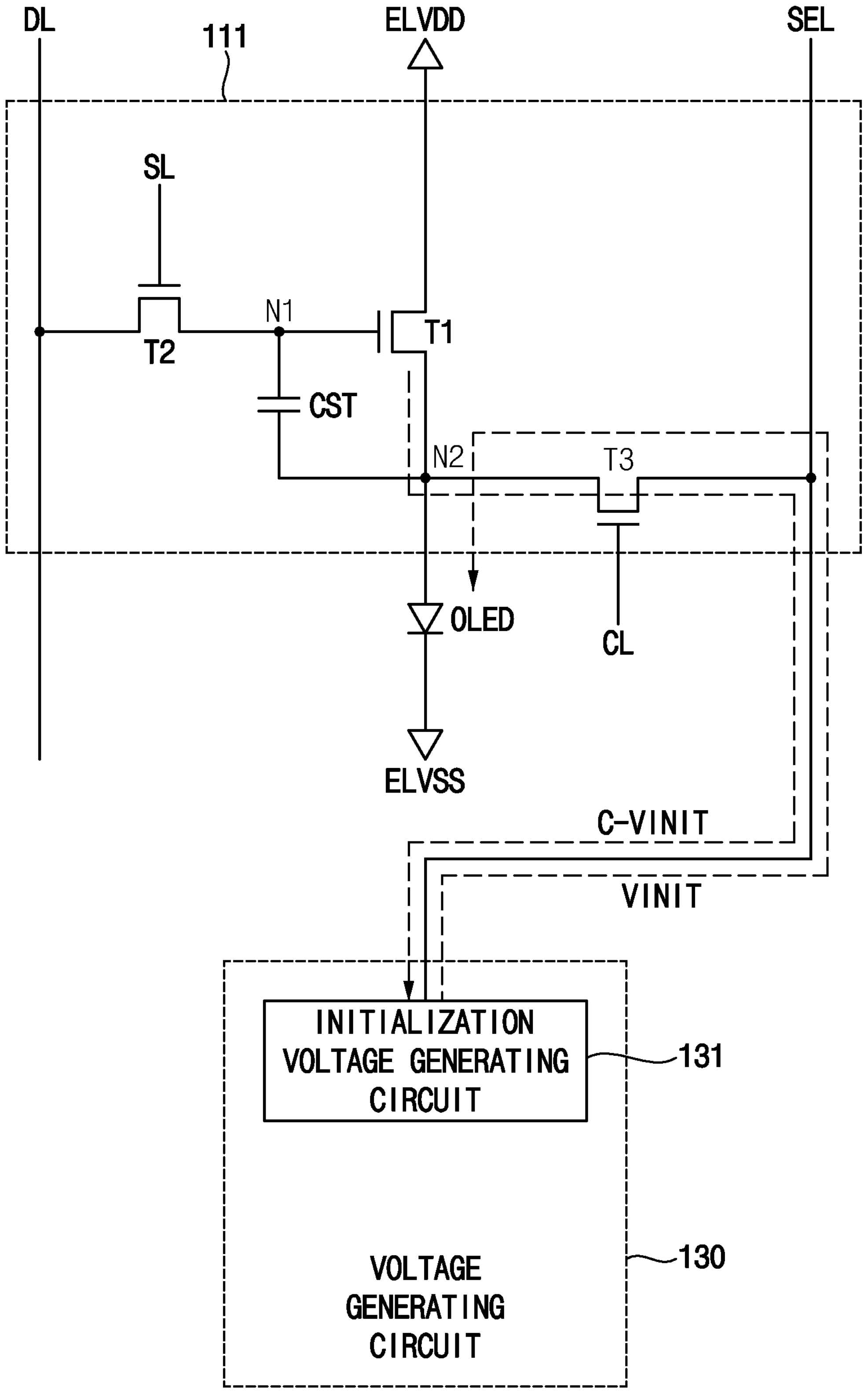
FIG. 6 is a diagram for describing that an initialization voltage is applied to an initialization target node within a pixel circuit in an initialization operation period of the pixel circuit included in the display device of FIG. 1.

Here, the voltage generating circuit 130 may include an initialization voltage generating circuit 131 (e.g., a DC-DC converter, an amplifier, or the like having a current sinking structure) which is configured to generate and output the initialization voltage VINIT as shown in FIG. 6, which is to be applied to an initialization target node in the pixel circuit 111 in an initialization operation period of the pixel circuit 111. Here, the initialization target node in the pixel circuit 111 may correspond to an anode of the light emitting element connected to the pixel circuit 111. The voltage generating circuit 130 may output the initialization voltage VINIT for initializing the initialization target node in the pixel circuit 111 at a first time point TA or TA' corresponding to a time point (i.e., TA shown in FIG. 2) at which the input power supply voltage VIN is received or a time point (i.e., TA' shown in FIG. 3) that is later than the time point at which the input power supply voltage VIN is received by a predetermined time. This will be described in detail below with reference to FIGS. 2 and 3.

The over-current protecting circuit 140 may monitor an over-current generated inside the display device 100, and generate a shut-down request signal STS for shutting down at least one of the display panel 110, the display panel driving circuit 120, and the voltage generating circuit 130 when the over-current is detected. Here, the over-current protecting circuit 140 may perform a first over-current protecting operation of detecting whether an initialization voltage current C-VINIT caused by the initialization voltage VINIT is an over-current in a power-on monitoring period PMP that is a period between the first time point TA or TA' at which the initialization voltage VINIT starts to be output and a second time point TB at which the scan clock signal SLK starts to be output, and perform a second over-current protecting operation of detecting whether the initialization voltage current C-VINIT caused by the initialization voltage VINIT is the over-current in the initialization operation period of the pixel circuit 111 (e.g., an initialization operation may be sequentially performed on the pixel circuit 111 for each scan line in a display operation period DP).

Meanwhile, the display panel driving circuit 120 may shut down at least one of the display panel 110, the display panel driving circuit 120, and the voltage generating circuit 130 when the shut-down request signal STS is received from the over-current protecting circuit 140. Accordingly, the display device 100 may shut down at least one of the display panel 110, the display panel driving circuit 120, and the voltage generating circuit 130 when the over-current is detected due to a short-circuit defect or the like which occurs between voltage lines through which the display panel voltages P-VOL and the driving circuit voltages D-VOL are transmitted, or a burnt defect or the like which occurs due to a foreign substance and the like within the display device 100, so that the over-current may be prevented from flowing inside the display device 100, and thus the display device 100 may be prevented from exploding, or a fire may be prevented from occurring in the display device 100.

In an embodiment, as shown in FIG. 2, the voltage generating circuit 130 may receive the input power supply voltage VIN from outside of the display device, for example, from a power supply (or referred to as a set power), when the display device 100 is powered on. Here, the voltage generating circuit 130 may output (i.e., start outputting) the initialization voltage VINIT for initializing the initialization target node in the pixel circuit 111 at the first time point TA corresponding to the time point at which the input power supply voltage VIN is received. The display panel driving circuit 120 may output (i.e., start outputting) the scan clock signal SLK for generating the scan signal SS that is to be applied to the pixel circuit 111 (i.e., denoted by TOGGLE) at the second time point TB that is later than the first time point TA at which the initialization voltage VINIT is output. In other words, the voltage generating circuit 130 may output the initialization voltage VINIT before the scan clock signal SLK is output.

Thereafter, the voltage generating circuit 130 may supply the high power supply voltage ELVDD to the display panel 110 after the second time point TB at which the scan clock signal SLK is output and before a third time point TC at which the scan signal SS and the data signal DS are generated and applied to the display panel 110. In other words, when the high power supply voltage ELVDD is applied to the display panel 110, and the scan signal SS and the data signal DS are generated and applied to the display panel 110, the display operation period DP may start.

The display panel driving circuit 120 may apply the scan signal SS and the data signal DS to the display panel 110 at the third time point TC to start the display operation period DP. Here, the display operation period DP may refer to a period during which an image is displayed on the display panel 110, and may include, for example, an initialization operation period during which the initialization voltage VINIT is applied to the initialization target node (e.g., the anode of the light emitting element) in the pixel circuit 111, a data write operation period during which a data voltage corresponding to the data signal DS is stored in the storage capacitor in the pixel circuit 111, and a light emitting operation period during which the light emitting element in the pixel circuit 111 emits light based on the data signal DS stored in the storage capacitor.

The over-current protecting circuit 140 may perform the first over-current protecting operation of detecting whether the initialization voltage current C-VINIT caused by the initialization voltage VINIT is the over-current in the power-on monitoring period PMP that is set between the first time point TA at which the initialization voltage VINIT is output and the second time point TB at which the scan clock signal SLK is output. In an embodiment, the power-on monitoring period PMP may be set as an entire period between the first time point TA at which the initialization voltage VINIT is output and the second time point TB at which the scan clock signal SLK is output. In another embodiment, the power-on monitoring period PMP may be set as a partial period between the first time point TA at which the initialization voltage VINIT is output and the second time point TB at which the scan clock signal SLK is output.

In addition, the over-current protecting circuit 140 may perform the second over-current protecting operation of detecting whether the initialization voltage current C-VINIT caused by the initialization voltage VINIT is the over-current in the initialization operation period of the pixel circuit 111 during which the initialization voltage VINIT is applied to the initialization target node in the pixel circuit 111 while an image is displayed on the display panel 110 (i.e., in the display operation period DP). In general, since the initialization voltage VINIT applied to the initialization target node (e.g., the anode of the light emitting element) in the pixel circuit 111 is lower than the data voltage corresponding to the data signal DS, when the initialization voltage VINIT is applied to the initialization target node in the pixel circuit 111, the initialization voltage current C-VINIT may flow from the initialization target node in the pixel circuit 111 to the initialization voltage generating circuit 131 (e.g., the DC-DC converter, the amplifier, or the like having the current sinking structure) in the voltage generating circuit 130 through the initialization transistor T3. Accordingly, the over-current protecting circuit 140 may detect whether the initialization voltage current C-VINIT caused by the initialization voltage VINIT is the over-current in the initialization operation period of the pixel circuit 111 to perform the second over-current protecting operation.

Meanwhile, in the power-on monitoring period PMP that is set between the first time point TA at which the initialization voltage VINIT is output and the second time point TB at which the scan clock signal SLK is output, the over-current protecting circuit 140 may generate the shut-down request signal STS for shutting down at least one of the display panel 110, the display panel driving circuit 120, and the voltage generating circuit 130 when a state in which the initialization voltage current C-VINIT is greater than a first reference current continues for a first reference time. In other words, in the power-on monitoring period PMP, the over-current protecting circuit 140 may determine the initialization voltage current C-VINIT as the over-current when the state in which the initialization voltage current C-VINIT is greater than the first reference current continues for the first reference time.

In addition, in the initialization operation period of the pixel circuit 111 during which the initialization voltage VINIT is applied to the initialization target node in the pixel circuit 111, the over-current protecting circuit 140 may generate the shut-down request signal STS for shutting down at least one of the display panel 110, the display panel driving circuit 120, and the voltage generating circuit 130 when a state in which the initialization voltage current C-VINIT is greater than a second reference current continues for a second reference time. In other words, in the initialization operation period of the pixel circuit 111 (e.g., the initialization operation may be sequentially performed on the pixel circuit 111 for each scan line in the display operation period DP), the over-current protecting circuit 140 may determine the initialization voltage current C-VINIT as the over-current when the state in which the initialization voltage current C-VINIT is greater than the second reference current continues for the second reference time.

In another embodiment, as shown in FIG. 3, the voltage generating circuit 130 may receive the input power supply voltage VIN from outside of the display device, for example, from a power supply, when the display device 100 is powered on. Here, the voltage generating circuit 130 may output (i.e., start outputting) the initialization voltage VINIT for initializing the initialization target node in the pixel circuit 111 at the first time point TA' that is later than the time point at which the input power supply voltage VIN is received. The display panel driving circuit 120 may output (i.e., start outputting) the scan clock signal SLK for generating the scan signal SS that is to be applied to the pixel circuit 111 (i.e., denoted by TOGGLE) at the second time point TB that is later than the first time point TA' at which the initialization voltage VINIT is output. In other words, the voltage generating circuit 130 may output the initialization voltage VINIT before the scan clock signal SLK is output.

Thereafter, the voltage generating circuit 130 may supplying the high power supply voltage ELVDD to the display panel 110 between the second time point TB at which the scan clock signal SLK is output and a third time point TC at which the scan signal SS and the data signal DS are generated and applied to the display panel 110 to prepare the display operation period DP. In other words, when the high power supply voltage ELVDD is applied to the display panel 110, the scan signal SS and the data signal DS are generated and applied to the display panel 110, the display operation period DP may start.

The display panel driving circuit 120 may apply the scan signal SS and the data signal DS to the display panel 110 at the third time point TC to start the display operation period DP. Here, the display operation period DP may refer to a period during which an image is displayed on the display panel 110, and may include, for example, an initialization operation period during which the initialization voltage VINIT is applied to the initialization target node (e.g., the anode of the light emitting element) in the pixel circuit 111, a data write operation period during which a data voltage corresponding to the data signal DS is stored in the storage capacitor in the pixel circuit 111, and a light emitting operation period during which the light emitting element in the pixel circuit 111 emits light based on the data signal DS stored in the storage capacitor.

The over-current protecting circuit 140 may perform the first over-current protecting operation of detecting whether the initialization voltage current C-VINIT caused by the initialization voltage VINIT is the over-current in the power-on monitoring period PMP that is set between the first time point TA' at which the initialization voltage VINIT is output and the second time point TB at which the scan clock signal SLK is output. In an embodiment, the power-on monitoring period PMP may be set as an entire period between the first time point TA' at which the initialization voltage VINIT is output and the second time point TB at which the scan clock signal SLK is output. In another embodiment, the power-on monitoring period PMP may be set as a partial period between the first time point TA' at which the initialization voltage VINIT is output and the second time point TB at which the scan clock signal SLK is output.

In addition, the over-current protecting circuit 140 may perform the second over-current protecting operation of detecting whether the initialization voltage current C-VINIT caused by the initialization voltage VINIT is the over-current in the initialization operation period of the pixel circuit 111 during which the initialization voltage VINIT is applied to the initialization target node in the pixel circuit 111 when a display operation of displaying an image on the display panel 110 is performed (i.e., in the display operation period DP). In general, since the initialization voltage VINIT applied to the initialization target node (e.g., the anode of the light emitting element) in the pixel circuit 111 is lower than the data voltage corresponding to the data signal DS, when the initialization voltage VINIT is applied to the initialization target node in the pixel circuit 111, the initialization voltage current C-VINIT may flow from the initialization target node in the pixel circuit 111 to the initialization voltage generating circuit 131 (e.g., the DC-DC converter, the amplifier, or the like having the current sinking structure) in the voltage generating circuit 130 through the initialization transistor T3. Accordingly, the over-current protecting circuit 140 may detect whether the initialization voltage current C-VINIT caused by the initialization voltage VINIT is the over-current in the initialization operation period of the pixel circuit 111 to perform the second over-current protecting operation.

Meanwhile, in the power-on monitoring period PMP that is set between the first time point TA' at which the initialization voltage VINIT is output and the second time point TB at which the scan clock signal SLK is output, the over-current protecting circuit 140 may generate the shut-down request signal STS for shutting down at least one of the display panel 110, the display panel driving circuit 120, and the voltage generating circuit 130 when a state in which the initialization voltage current C-VINIT is greater than a first reference current continues for a first reference time. In other words, in the power-on monitoring period PMP, the over-current protecting circuit 140 may determine the initialization voltage current C-VINIT as the over-current when the state in which the initialization voltage current C-VINIT is greater than the first reference current continues for the first reference time.

In addition, in the initialization operation period of the pixel circuit 111 during which the initialization voltage VINIT is applied to the initialization target node in the pixel circuit 111, the over-current protecting circuit 140 may generate the shut-down request signal STS for shutting down at least one of the display panel 110, the display panel driving circuit 120, and the voltage generating circuit 130 when a state in which the initialization voltage current C-VINIT is greater than a second reference current continues for a second reference time. In other words, in the initialization operation period of the pixel circuit 111 (e.g., the initialization operation may be sequentially performed on the pixel circuit 111 for each scan line in the display operation period DP), the over-current protecting circuit 140 may determine the initialization voltage current C-VINIT as the over-current when the state in which the initialization voltage current C-VINIT is greater than the second reference current continues for the second reference time.

In an embodiment, the first reference current (e.g., at a level of 50 mA) that is set in the power-on monitoring period PMP may be set to be smaller than the second reference current (e.g., at a level of 500 mA) that is set in the initialization operation period of the pixel circuit 111. In other words, since no initialization voltage current C-VINIT has to flow in a normal state in the power-on monitoring period PMP, and the initialization voltage current C-VINIT that is generated by the burnt defect and the like caused by the foreign substance and the like in the display device 100 is relatively small, the first reference current that is set in the power-on monitoring period PMP may be set to be relatively small. Accordingly, the over-current protecting circuit 140 may detect a minute over-current (e.g., due to the burnt defect, etc.) caused by the initialization voltage in the power-on monitoring period PMP by setting the first reference current to be smaller than the second reference current. Meanwhile, since the initialization voltage current C-VINIT having a predetermined level flows from the initialization target node in the pixel circuit 111 to the initialization voltage generating circuit 131 having a current sinking structure even in the normal state in the initialization operation period of the pixel circuit 111, when the second reference current is set to be relatively small, the over-current protecting circuit 140 may detect the initialization voltage current C-VINIT having the predetermined level as the over-current even when the initialization voltage current C-VINIT is not the over-current. Therefore, the second reference current that is set in the initialization operation period of the pixel circuit 111 may be set to be relatively high. In other words, the over-current protecting circuit 140 may detect the over-current (e.g., due to a short-circuit defect, etc.) caused by the initialization voltage without an error under a relatively high reference current condition in the initialization operation period of the pixel circuit 111.

In an embodiment, the first reference current that is set in the power-on monitoring period PMP, the second reference current that is set in the initialization operation period of the pixel circuit 111, the first reference time that is set in the power-on monitoring period PMP, and the second reference time that is set in the initialization operation period of the pixel circuit 111 may be adjustable in consideration of conditions such as an expected magnitude of the over-current and durability of internal circuits against the over-current. In some embodiments, the over-current protecting circuit 140 may not determine the over-current of the initialization voltage current C-VINIT generated within a very short time (e.g., at a level of 100 μs) as the over-current by applying a filter to prevent a situation in which at least one of the display panel 110, the display panel driving circuit 120, and the voltage generating circuit 130 is shut down due to the over-current of the initialization voltage current C-VINIT generated within the very short time (e.g., at a level of 100 μs).

As described above, the display device 100 may include a display panel 110 including a pixel circuit 111, a display panel driving circuit 120 configured to drive the display panel 110, a voltage generating circuit 130 configured to receive an input power supply voltage VIN when the display device 100 is powered on and generate display panel voltages P-VOL for driving the display panel 110 and driving circuit voltages D-VOL for driving the display panel driving circuit 120 based on the input power supply voltage VIN, and an over-current protecting circuit 140 configured to monitor an over-current generated inside the display device 100, and generate a shut-down request signal STS for shutting down at least one of the display panel 110, the display panel driving circuit 120, and the voltage generating circuit 130 when the over-current is detected, wherein the voltage generating circuit 130 is configured to output an initialization voltage VINIT for initializing an initialization target node in the pixel circuit 111 at a first time point TA or TA' corresponding to a time point at which the input power supply voltage VIN is received or a time point that is later than the time point at which the input power supply voltage VIN is received by a predetermined time, the display panel driving circuit 120 is configured to output a scan clock signal SLK for generating a scan signal SS that is to be applied to the pixel circuit 111 at a second time point TB that is later than the first time point TA or TA', and the over-current protecting circuit 140 is configured to perform a first over-current protecting operation of detecting whether the initialization voltage current C-VINIT caused by the initialization voltage VINIT is the over-current in a power-on monitoring period PMP that is set between the first time point TA or TA' and the second time point TB, so that a minute over-current (e.g., due to a burnt defect, etc.) caused by the initialization voltage VINIT may be detected under a relatively low reference current condition in the power-on monitoring period PMP. Accordingly, the display device 100 according to one embodiment of the present inventive concept may prevent an explosion, a fire, and the like which cause a burnt defect and the like by detecting a minute over-current (e.g., due to a burnt defect, etc.) caused by an initialization voltage VINIT in a power-on sequence period which a conventional over-current protecting circuit may not detect.

In addition, according to the display device 100, the over-current protecting circuit 140 may perform the second over-current protecting operation of detecting whether the initialization voltage current C-VINIT caused by the initialization voltage VINIT is the over-current in the initialization operation period of the pixel circuit 111 during which the initialization voltage VINIT is applied to the initialization target node in the pixel circuit 111 when the display operation of displaying an image on the display panel 110 is performed (i.e., in the display operation period DP), so that the over-current (e.g., due to a short-circuit defect, etc.) caused by the initialization voltage VINIT may be detected without an error under a relatively high reference current condition in the initialization operation period of the pixel circuit 111.

Figure 4A:
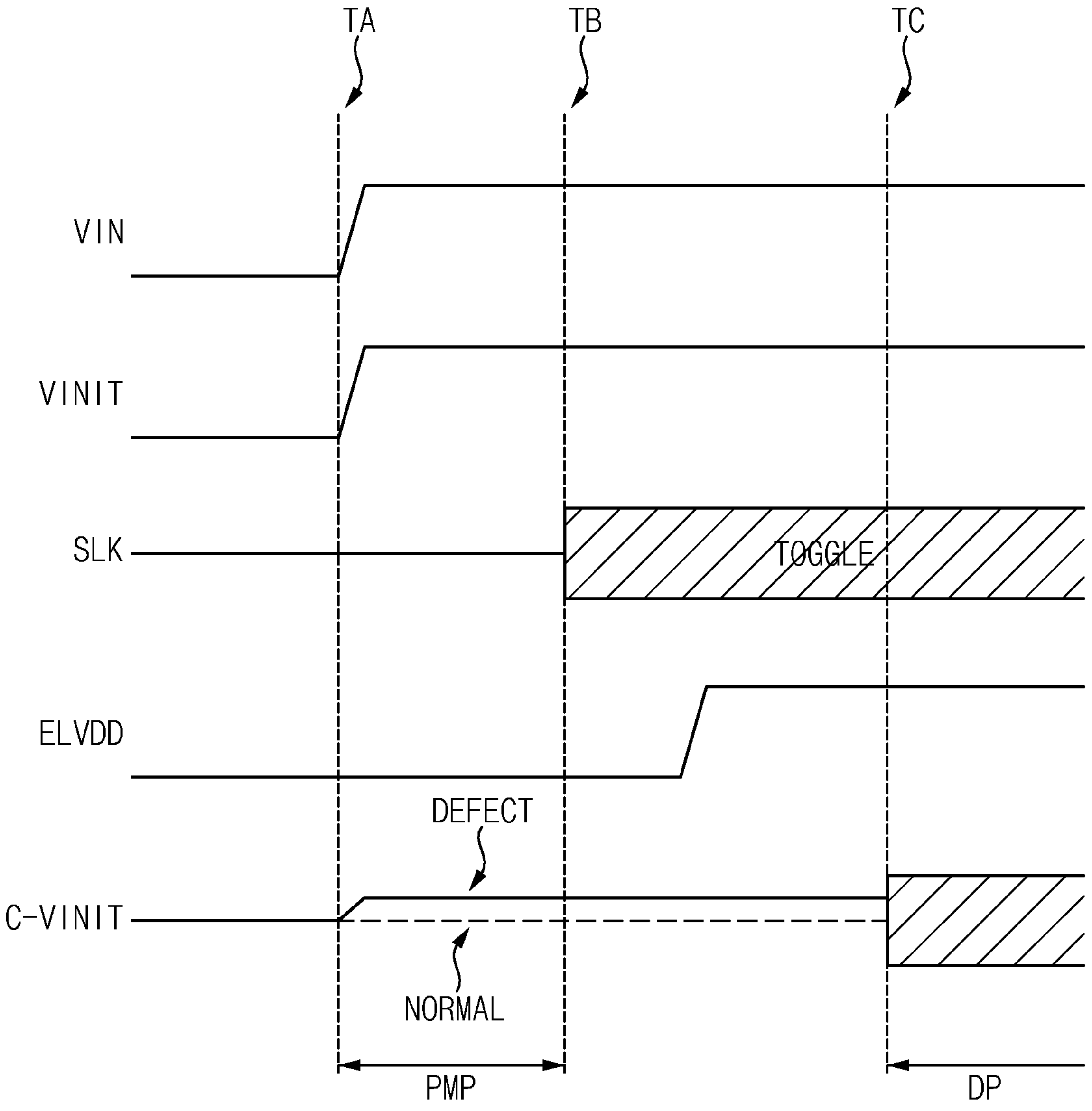
FIGS. 4A and 4B are diagrams for describing an example in which the display device of FIG. 1 performs a first over-current protecting operation in a power-on monitoring period.
Figure 4B:
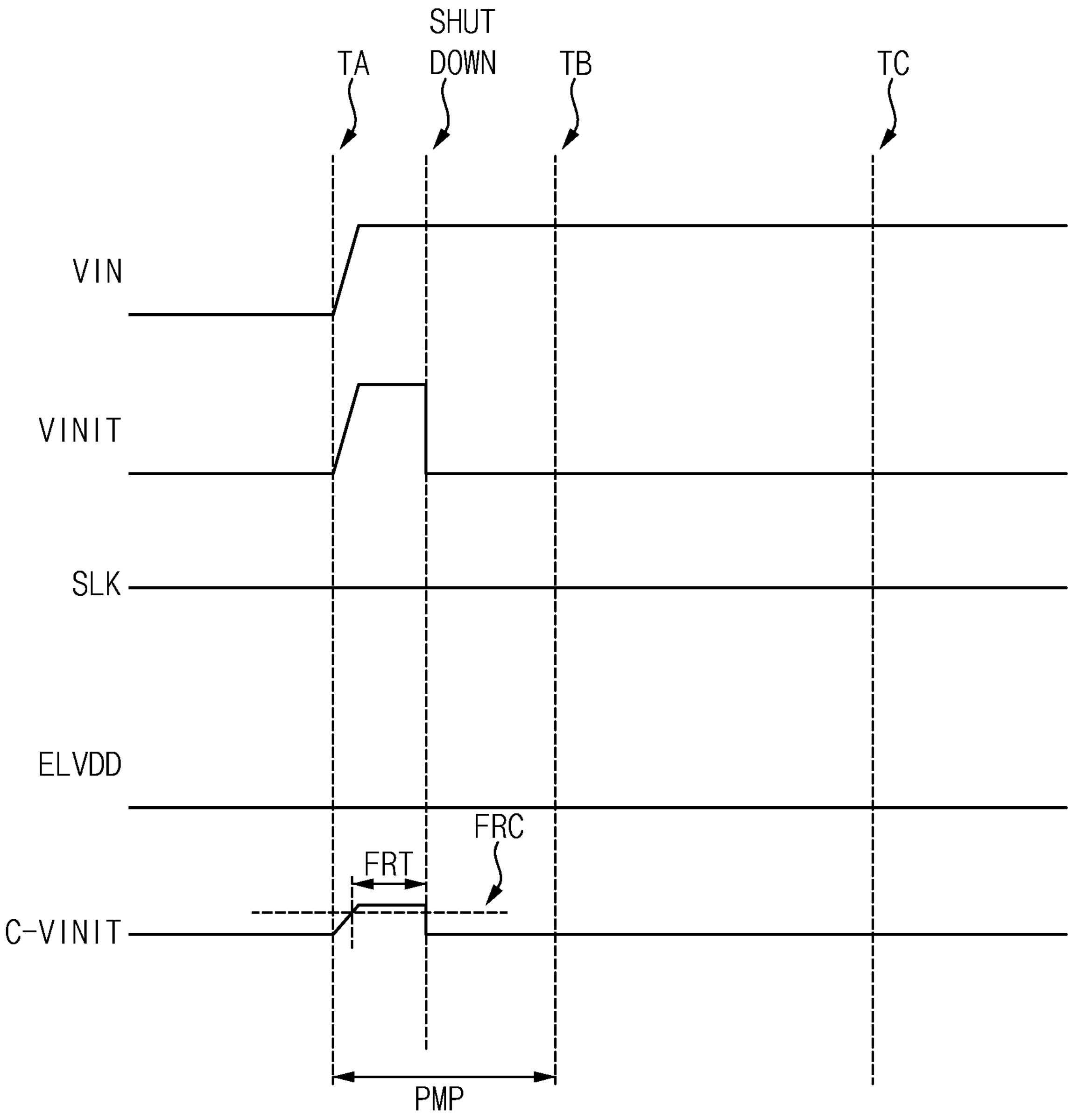

FIGS. 4A and 4B are diagrams for describing an example in which the display device of FIG. 1 performs a first over-current protecting operation in a power-on monitoring period.

Referring to FIGS. 4A and 4B, the display device 100 (specifically, the voltage generating circuit 130) may output the initialization voltage VINIT for initializing the initialization target node in the pixel circuit 111 at the first time point TA which corresponds to the time point at which the input power supply voltage VIN is received. Therefore, the display device 100 (specifically, the over-current protecting circuit 140) may perform the first over-current protecting operation in the power-on monitoring period PMP that is set between the first time point TA at which the initialization voltage VINIT for initializing the initialization target node (e.g., the anode of the light emitting element) in the pixel circuit 111 is output and the second time point TB at which the scan clock signal SLK for generating the scan signal SS that is to be applied to the pixel circuit 111 is output (i.e., denoted by TOGGLE). However, although the power-on monitoring period PMP has been shown in FIGS. 4A and 4B as being set as an entire period between the first time point TA at which the initialization voltage VINIT is output and the second time point TB at which the scan clock signal SLK is output, in some embodiments, the power-on monitoring period PMP may be set as a partial period between the first time point TA at which the initialization voltage VINIT is output and the second time point TB at which the scan clock signal SLK is output.

As shown in FIG. 4A, since a current path through which the initialization voltage current C-VINIT flows is not formed until the initialization voltage VINIT is applied to the initialization target node of the pixel circuit 111 (i.e., before the third time point TC at which the display operation period DP starts) even when the initialization voltage VINIT is output from the first time point TA, no initialization voltage current C-VINIT has to flow from the first time point TA at which the initialization voltage VINIT is output to the third time point TC at which the display operation period DP starts in a normal state where a burnt defect and the like caused by a foreign substance and the like within the display device 100 do not occur (i.e., denoted by NORMAL). However, a minute initialization voltage current C-VINIT may flow between the first time point TA at which the initialization voltage VINIT is output and the third time point TC at which the display operation period DP starts in a defect state where the burnt defect and the like caused by the foreign substance and the like in the display device 100 are present (i.e., denoted by DEFECT). Here, the minute initialization voltage current C-VINIT may be detected at least during the power-on monitoring period PMP in the defect state where the burnt defect and the like caused by the foreign substance and the like in the display device 100 are present. In particular, since the burnt defect and the like gradually become larger as the minute initialization voltage current C-VINIT continuously flow, the display device 100 has to perform the first over-current protecting operation of detecting whether the initialization voltage current C-VINIT caused by the initialization voltage VINIT is the over-current in the power-on monitoring period PMP.

As shown in FIG. 4B, in the power-on monitoring period PMP that is set between the first time point TA at which the initialization voltage VINIT is output and the second time point TB at which the scan clock signal SLK is output, the over-current protecting circuit 140 may determine whether a state in which the initialization voltage current C-VINIT caused by the initialization voltage VINIT is greater than the first reference current FRC (i.e., a criterion for determining whether the initialization voltage current C-VINIT is the over-current in the power-on monitoring period PMP) continues for the first reference time FRT. Here, when the state in which the initialization voltage current C-VINIT is greater than the first reference current FRC continues for the first reference time FRT, the over-current protecting circuit 140 may determine the initialization voltage current C-VINIT as the over-current (i.e., determine a state as the defect state where the burnt defect and the like caused by the foreign substance and the like within the display device 100 are present), and may generate the shut-down request signal STS for shutting down at least one of the display panel 110, the display panel driving circuit 120, and the voltage generating circuit 130. As a result, at least one of the display panel 110, the display panel driving circuit 120, and the voltage generating circuit 130 may be shut down in response to the shut-down request signal STS (i.e., denoted by SHUT-DOWN). For example, as shown in FIG. 4B, as the voltage generating circuit 130 is shut down, the voltage generating circuit 130 may immediately stop outputting the initialization voltage VINIT, and may not output the high power supply voltage ELVDD between the second time point TB and the third time point TC. In addition, as the display panel driving circuit 120 is shut down, the display panel driving circuit 120 may not output the scan clock signal SLK at the second time point TB. Meanwhile, the first reference current FRC and the first reference time FRT may be adjustable. For example, a user may adjust the first reference current FRC and the first reference time FRT by using an inter-integrated circuit (I2C) interface.

Figure 5A:
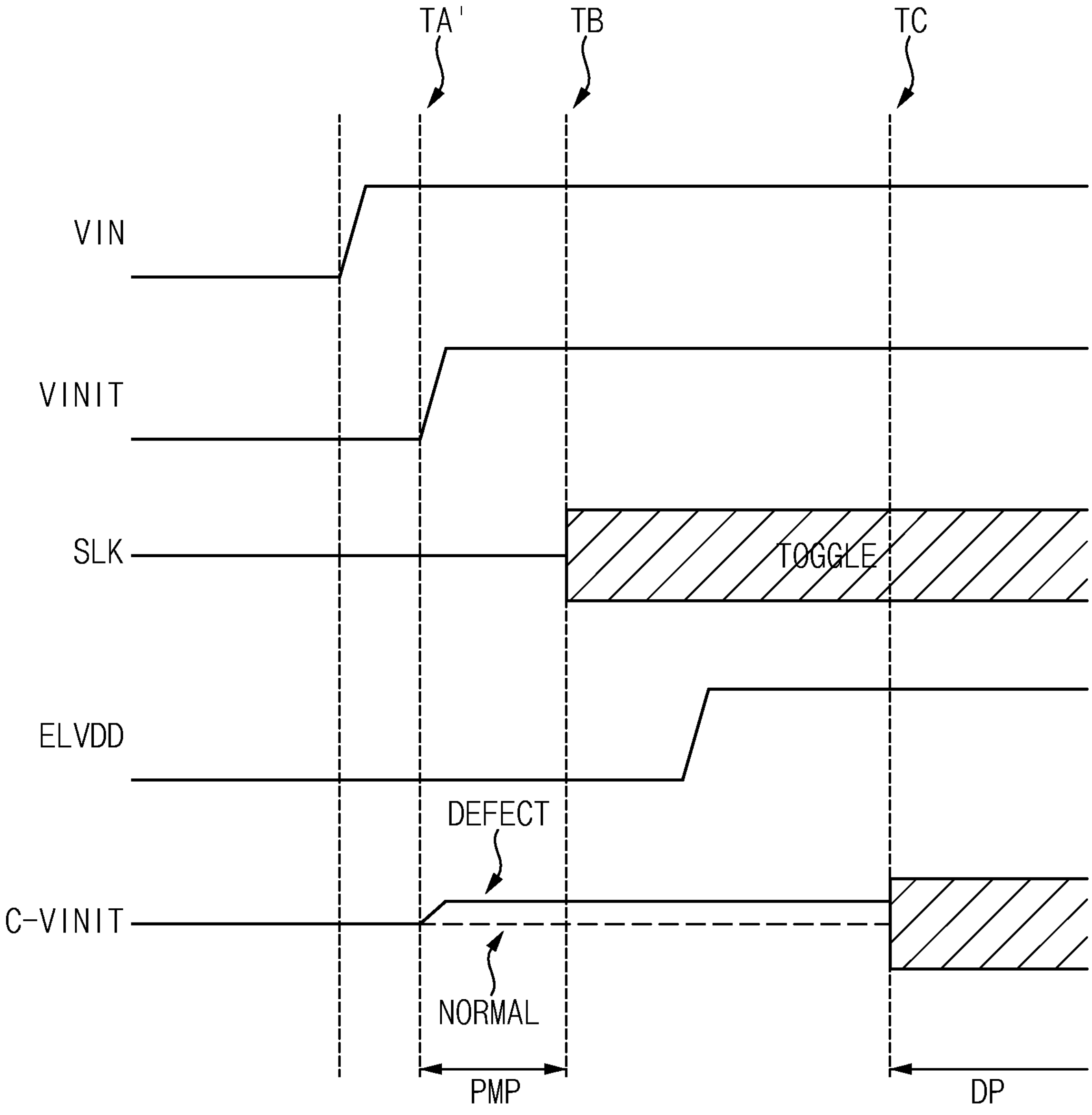
FIGS. 5A and 5B are diagrams for describing another example in which the display device of FIG. 1 performs a first over-current protecting operation in a power-on monitoring period.
Figure 5B:
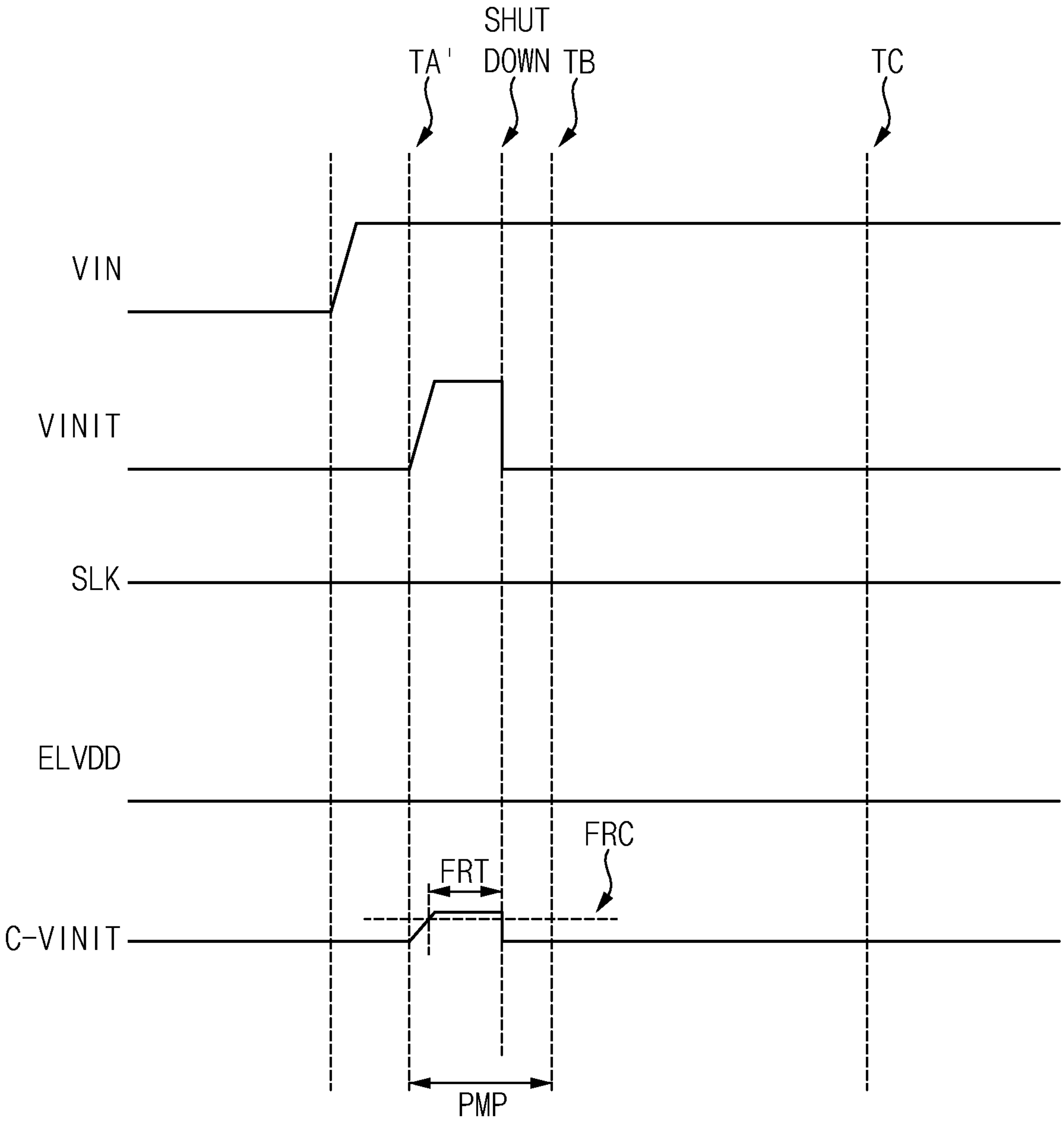

FIGS. 5A and 5B are diagrams for describing another example in which the display device of FIG. 1 performs a first over-current protecting operation in a power-on monitoring period.

Referring to FIGS. 5A and 5B, the display device 100 (specifically, the voltage generating circuit 130) may output the initialization voltage VINIT for initializing the initialization target node in the pixel circuit 111 at the first time point TA' that is later than the time point at which the input power supply voltage VIN is received. In other words, while the initialization voltage VINIT for initializing the initialization target node in the pixel circuit 111 is output at the first time point TA corresponding to the time point at which the input power supply voltage VIN is received in FIGS. 4A and 4B, the initialization voltage VINIT for initializing the initialization target node in the pixel circuit 111 may be output at the first time point TA' that is later than the time point at which the input power supply voltage VIN is received in FIGS. 5A and 5B. Therefore, the display device 100 (specifically, the over-current protecting circuit 140) may perform the first over-current protecting operation in the power-on monitoring period PMP that is set between the first time point TA' at which the initialization voltage VINIT for initializing the initialization target node (e.g., the anode of the light emitting element) in the pixel circuit 111 is output and the second time point TB at which the scan clock signal SLK for generating the scan signal SS that is to be applied to the pixel circuit 111 is output (i.e., denoted by TOGGLE). However, although the power-on monitoring period PMP has been shown in FIGS. 5A and 5B as being set as an entire period between the first time point TA' at which the initialization voltage VINIT is output and the second time point TB at which the scan clock signal SLK is output, in some embodiments, the power-on monitoring period PMP may be set as a partial period between the first time point TA' at which the initialization voltage VINIT is output and the second time point TB at which the scan clock signal SLK is output.

As shown in FIG. 5A, since a current path through which the initialization voltage current C-VINIT flows is not formed until the initialization voltage VINIT is applied to the initialization target node of the pixel circuit 111 (i.e., before the third time point TC at which the display operation period DP starts) even when the initialization voltage VINIT is output from the first time point TA', no initialization voltage current C-VINIT has to flow between the first time point TA' at which the initialization voltage VINIT is output and the third time point TC at which the display operation period DP starts in a normal state where a burnt defect and the like caused by a foreign substance and the like in the display device 100 do not occur (i.e., denoted by NORMAL). However, a minute initialization voltage current C-VINIT may flow between the first time point TA' at which the initialization voltage VINIT is output and the third time point TC at which the display operation period DP starts in a defect state where the burnt defect and the like caused by the foreign substance and the like in the display device 100 are present (i.e., denoted by DEFECT). Therefore, the minute initialization voltage current C-VINIT may be detected at least during the power-on monitoring period PMP in the defect state where the burnt defect and the like caused by the foreign substance and the like in the display device 100 are present. In particular, since the burnt defect and the like gradually become larger as the minute initialization voltage current C-VINIT continuously flow, the display device 100 has to perform the first over-current protecting operation of detecting whether the initialization voltage current C-VINIT caused by the initialization voltage VINIT is the over-current in the power-on monitoring period PMP.

As shown in FIG. 5B, in the power-on monitoring period PMP that is set between the first time point TA' at which the initialization voltage VINIT is output and the second time point TB at which the scan clock signal SLK is output, the over-current protecting circuit 140 may determine whether a state in which the initialization voltage current C-VINIT caused by the initialization voltage VINIT is greater than the first reference current FRC (i.e., a criterion for determining whether the initialization voltage current C-VINIT is the over-current in the power-on monitoring period PMP) continues for the first reference time FRT. Here, when the state in which the initialization voltage current C-VINIT is greater than the first reference current FRC continues for the first reference time FRT, the over-current protecting circuit 140 may determine the initialization voltage current C-VINIT as the over-current (i.e., determine a state as the defect state where the burnt defect and the like caused by the foreign substance and the like within the display device 100 are present), and may generate the shut-down request signal STS for shutting down at least one of the display panel 110, the display panel driving circuit 120, and the voltage generating circuit 130. As a result, at least one of the display panel 110, the display panel driving circuit 120, and the voltage generating circuit 130 may be shut down in response to the shut-down request signal STS (i.e., denoted by SHUT-DOWN). For example, as shown in FIG. 5B, as the voltage generating circuit 130 is shut down, the voltage generating circuit 130 may immediately stop outputting the initialization voltage VINIT, and may not output the high power supply voltage ELVDD between the second time point TB and the third time point TC. In addition, as the display panel driving circuit 120 is shut down, the display panel driving circuit 120 may not output the scan clock signal SLK at the second time point TB. Meanwhile, the first reference current FRC and the first reference time FRT may be adjustable.

Figure 7:
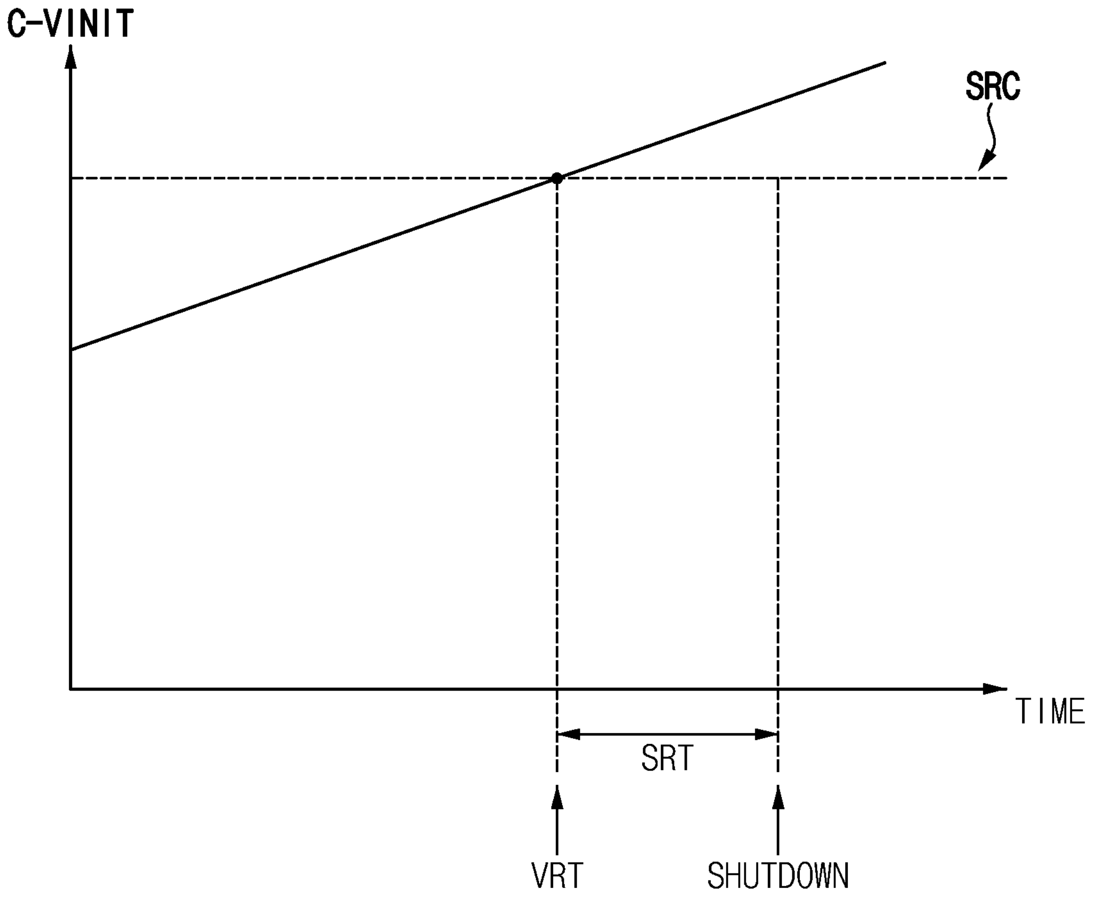
FIG. 7 is a diagram for describing that the display device of FIG. 1 performs a second over-current protecting operation in an initialization operation period of a pixel circuit included in the display device of FIG. 1.

FIG. 6 is a diagram for describing that an initialization voltage is applied to an initialization target node in a pixel circuit in an initialization operation period of the pixel circuit included in the display device of FIG. 1, and FIG. 7 is a diagram for describing that the display device of FIG. 1 performs a second over-current protecting operation in an initialization operation period of a pixel circuit included in the display device of FIG. 1.

Referring to FIGS. 6 and 7, the pixel circuit 111 may include a driving transistor T1, a switching transistor T2, an initialization transistor T3, and a storage capacitor CST. A light emitting element OLED may be connected to the pixel circuit 111. Here, the pixel circuit 111 may be connected to the initialization voltage generating circuit 131 in the voltage generating circuit 130 configured to apply the initialization voltage VINIT to the anode of the light emitting element (i.e., a second node N2). However, since the pixel circuit 111 shown in FIG. 6 has been provided for illustrative purposes, a structure of the pixel circuit 111 is not limited thereto.

The driving transistor T1 may include a first terminal connected to the high power supply voltage ELVDD, a gate terminal connected to a first node N1, and a second terminal connected to the second node N2. In other words, the driving transistor T1 may be connected in series with the light emitting element OLED between the high power supply voltage ELVDD and the low power supply voltage ELVSS. In the light emitting operation period of the pixel circuit 111, the driving transistor T1 may allow a driving current to flow through the light emitting element OLED based on the data voltage stored in the storage capacitor CST.

The switching transistor T2 may include a first terminal connected to the data line DL, a gate terminal connected to the scan line SL, and a second terminal connected to the first node N1. In the data write operation period of the pixel circuit 111, the switching transistor T2 may transmit the data voltage (i.e., corresponding to the data signal DS) applied through the data line DL to the first node N1 in response to the scan signal SS applied through the scan line SL.

The storage capacitor CST may include a first terminal connected to the first node N1, and a second terminal connected to the second node N2. In the data write operation period of the pixel circuit 111, the storage capacitor CST may store the data voltage transmitted to the first node N1.

The light emitting element OLED may include an anode connected to the second node N2, and a cathode connected to the low power supply voltage ELVSS. In the light emitting operation period of the pixel circuit 111, the light emitting element OLED may emit light based on the driving current provided from the driving transistor T1. In an embodiment, the light emitting element OLED may be an organic light emitting diode.

The initialization transistor T3 may include a first terminal connected to the second node N2, a gate terminal connected to an initialization control line CL, and a second terminal connected to the initialization voltage line SEL. In the initialization operation period of the pixel circuit 111, the initialization transistor T3 may transmit the initialization voltage VINIT applied through the initialization voltage line SEL to the anode of the light emitting element OLED (i.e., the second node N2) in response to an initialization control signal applied through the initialization control line CL. As a result, the anode of the light emitting element OLED (i.e., the second node N2) may be initialized to the initialization voltage VINIT.

In some embodiments, the initialization transistor T3 may also serve as the sensing transistor configured to perform a sensing operation for detecting characteristics of the light emitting element OLED. In this case, in a sensing operation period of the pixel circuit 111, the initialization transistor T3 (i.e., the sensing transistor) may output a sensing current to the initialization voltage line (i.e., a sensing voltage line) in response to the initialization control signal (i.e., a sensing control signal) applied through the initialization control line CL (i.e., a sensing control line).

Meanwhile, as shown in FIG. 6, in the initialization operation period of the pixel circuit 111, when the initialization voltage VINIT generated by the initialization voltage generating circuit 131 in the voltage generating circuit 130 is applied to the anode of the light emitting element OLED (i.e., the second node N2) through the initialization voltage line SEL and the initialization transistor T3 which is turned on, a current path may be formed between the anode of the light emitting element OLED (i.e., the second node N2) and the initialization voltage generating circuit 131 in the voltage generating circuit 130. The initialization voltage current C-VINIT caused by the initialization voltage VINIT may flow along the current path. In general, since the initialization voltage VINIT applied to the anode of the light emitting element OLED (i.e., the second node N2) is lower than the data voltage corresponding to the data signal DS, when the initialization voltage VINIT is applied to the anode of the light emitting element OLED (i.e., the second node N2), the initialization voltage current C-VINIT may flow from the anode of the light emitting element OLED (i.e., the second node N2) to the initialization voltage generating circuit 131 in the voltage generating circuit 130. The initialization voltage generating circuit 131 in the voltage generating circuit 130 may be implemented as a DC-DC converter, an amplifier, or the like having a current sinking structure.

As described above, while the initialization voltage current C-VINIT having a predetermined level flows from the anode of the light emitting element OLED (i.e., the second node N2) to the initialization voltage generating circuit 131 having the current sinking structure even in the normal state in the initialization operation period of the pixel circuit 111, when a short-circuit defect and the like occur in the initialization voltage line SEL, the initialization voltage current C-VINIT exceeding the predetermined level may flow from the anode of the light emitting element OLED (i.e., the second node N2) to the initialization voltage generating circuit 131 having the current sinking structure. Therefore, the over-current protecting circuit 140 may perform the second over-current protecting operation of detecting whether the initialization voltage current C-VINIT caused by the initialization voltage VINIT is the over-current in the initialization operation period of the pixel circuit 111 when the display operation of displaying an image on the display panel 110 is performed. Meanwhile, since the initialization transistor T3 of the pixel circuit 111 is turned off in the power-on monitoring period PMP described above, no initialization voltage current C-VINIT flow through the initialization voltage line SEL in the normal state. However, since the initialization voltage current C-VINIT may flow to the initialization voltage generating circuit 131 through the initialization voltage line SEL even in the power-on monitoring period PMP described above when the burnt defect and the like caused by the foreign substance and the like within the display device 100 are present, the over-current protecting circuit 140 may perform the first over-current protecting operation of detecting whether the initialization voltage current C-VINIT actually flows through the initialization voltage line SEL in the power-on monitoring period PMP described above. For this reason, the first reference current (e.g., at a level of 50 mA) that is set in the power-on monitoring period PMP described above may be set to be smaller than the second reference current (e.g., at a level of 500 mA) that is set in the initialization operation period of the pixel circuit 111.

In detail, as shown in FIG. 7, when the display operation of displaying an image on the display panel 110 is performed (i.e., in the display operation period DP), in the initialization operation period of the pixel circuit 111 during which the initialization voltage VINIT is applied to the anode of the light emitting element OLED (i.e., the second node N2), the over-current protecting circuit 140 may determine whether a state in which the initialization voltage current C-VINIT caused by the initialization voltage VINIT is greater than the second reference current SRC (i.e., a criterion for determining whether the initialization voltage current C-VINIT is the over-current in the initialization operation period of the pixel circuit 111) continues for the second reference time SRT. Here, when the state in which the initialization voltage current C-VINIT is greater than the second reference current SRC continues for the second reference time SRT, the over-current protecting circuit 140 may determine the initialization voltage current C-VINIT as the over-current (i.e., determine a state as a defect state where the short-circuit defect and the like are present in the initialization voltage line SEL), and may generate the shut-down request signal STS for shutting down at least one of the display panel 110, the display panel driving circuit 120, and the voltage generating circuit 130. As a result, at least one of the display panel 110, the display panel driving circuit 120, and the voltage generating circuit 130 may be shut down in response to the shut-down request signal STS. For example, in FIG. 7, when the state in which the initialization voltage current C-VINIT is greater than the second reference current SRC continues for the second reference time SRT which starts from a time point (i.e., denoted by VRT) at which the initialization voltage current C-VINIT is equal to the second reference current SRC, at least one of the display panel 110, the display panel driving circuit 120, and the voltage generating circuit 130 may be shut down (i.e., denoted by SHUTDOWN). Meanwhile, the second reference current SRC and the second reference time SRT may be adjustable. For example, the user may adjust the second reference current SRC and the second reference time SRT by using the I2C interface.

Figure 8:
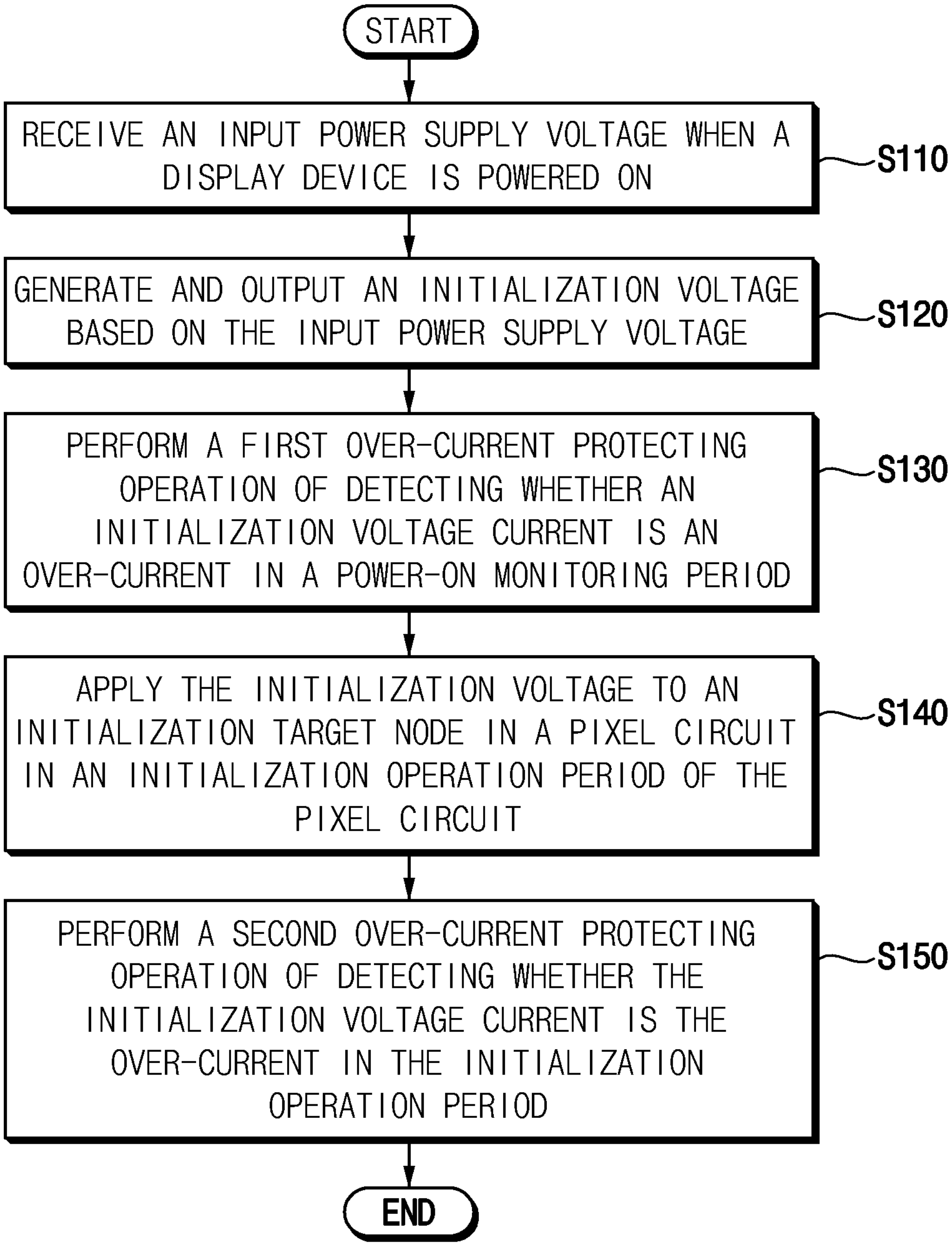
FIG. 8 is a flowchart illustrating a method of performing an over-current protecting operation of a display device according to embodiments.
Figure 9:
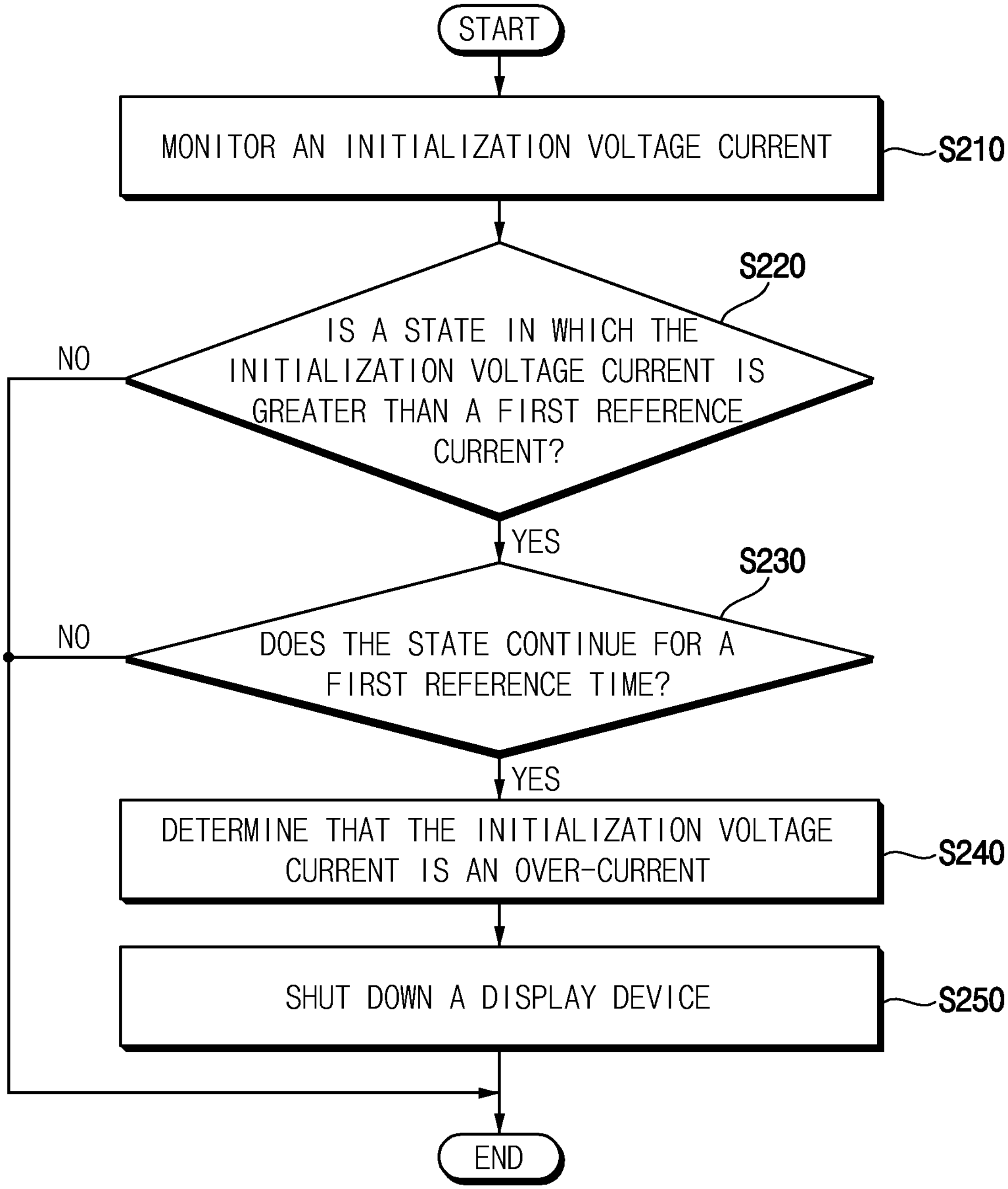
FIG. 9 is a flowchart illustrating an example in which the method of FIG. 8 performs a first over-current protecting operation in a power-on monitoring period.
Figure 10:
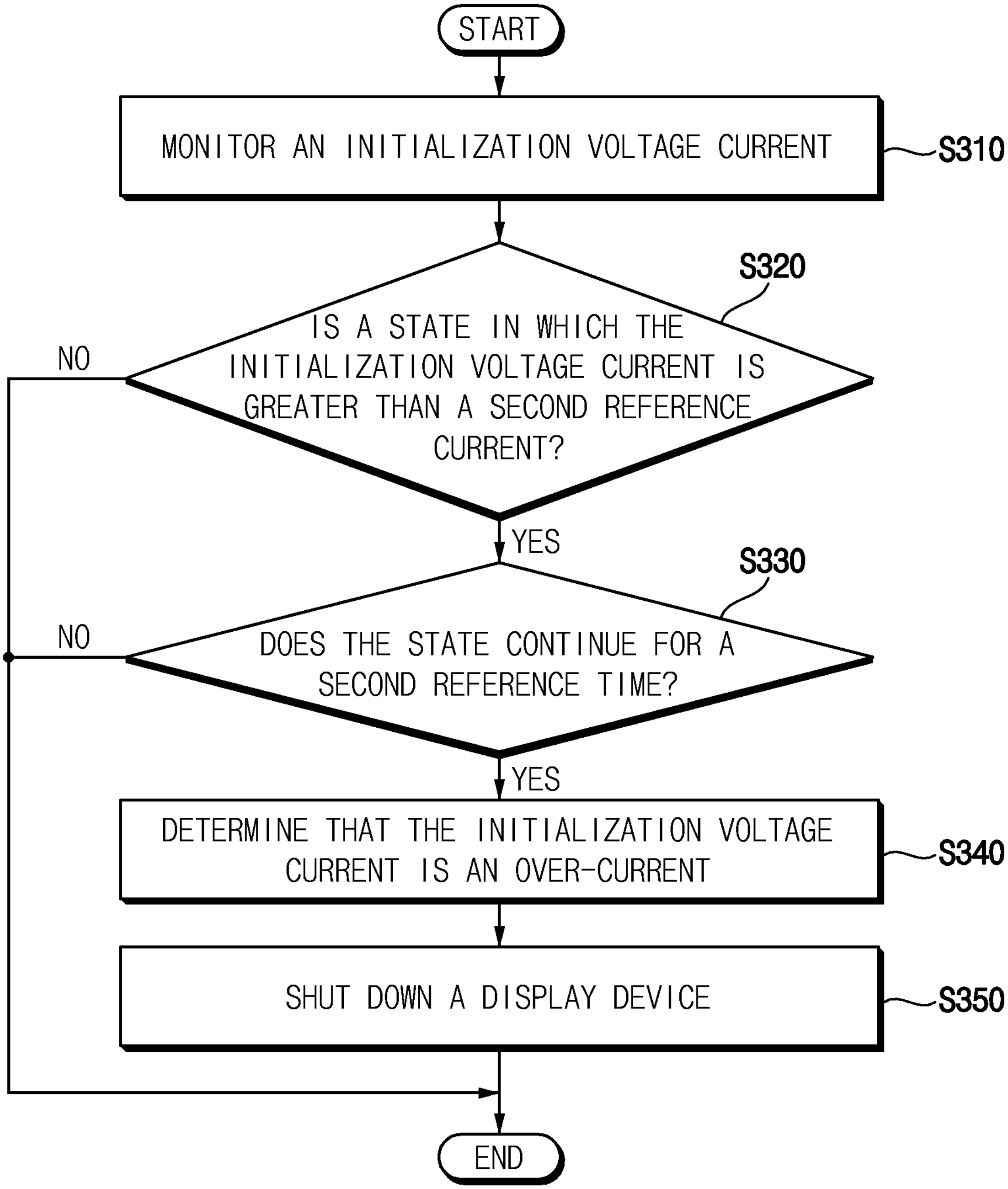
FIG. 10 is a flowchart illustrating an example in which the method of FIG. 8 performs a second over-current protecting operation in an initialization operation period of a pixel circuit.

FIG. 8 is a flowchart illustrating a method of performing an over-current protecting operation of a display device according to embodiments, FIG. 9 is a flowchart illustrating an example in which the method of FIG. 8 performs a first over-current protecting operation in a power-on monitoring period, and FIG. 10 is a flowchart illustrating an example in which the method of FIG. 8 performs a second over-current protecting operation in an initialization operation period of a pixel circuit.

Referring to FIGS. 8 to 10, a method of performing an over-current protecting operation of FIG. 8 may include receiving an input power supply voltage when the display device is powered on (S110), generating and outputting an initialization voltage for initializing an initialization target node (e.g., an anode of a light emitting element) in a pixel circuit based on the input power supply voltage (S120), performing a first over-current protecting operation of detecting whether an initialization voltage current caused by the initialization voltage is an over-current in a power-on monitoring period that is set between a first time point at which the initialization voltage is output and a second time point at which a scan clock signal for generating a scan signal that is to be applied to the pixel circuit is output (S130), applying the initialization voltage to the initialization target node in the pixel circuit in an initialization operation period of the pixel circuit after the second time point at which the scan clock signal is output (S140), and performing a second over-current protecting operation of detecting whether the initialization voltage current caused by the initialization voltage is the over-current in the initialization operation period of the pixel circuit (S150). In an embodiment, the first time point at which the initialization voltage is output may coincide with a time point at which the input power supply voltage is received. In another embodiment, the first time point at which the initialization voltage is output may be later than the time point at which the input power supply voltage is received. However, according to the above embodiments, the first time point at which the initialization voltage is output may be earlier than the second time point at which the scan clock signal is output, so that the power-on monitoring period may be set between the first time point at which the initialization voltage is output and the second time point at which the scan clock signal is output.

Meanwhile, as shown in FIG. 9, in the performing of the first over-current protecting operation in the power-on monitoring period that is set between the first time point at which the initialization voltage is output and the second time point at which the scan clock signal is output, the method of FIG. 8 may include monitoring the initialization voltage current caused by the initialization voltage (S210) and determining whether a state in which the initialization voltage current is greater than a first reference current continues for a first reference time (S220, S230). Here, the method of FIG. 8 may include determining the initialization voltage current as the over-current when the state in which the initialization voltage current is greater than the first reference current continues for the first reference time (S240). In this case, the method of FIG. 8 may include shutting down the display device (S250). Meanwhile, the method of FIG. 8 may include not determining the initialization voltage current as the over-current when the state in which the initialization voltage current is greater than the first reference current does not continue for the first reference time. Here, the first reference current used for detecting the over-current in the power-on monitoring period may be set to be smaller than the second reference current used for detecting the over-current in the initialization operation period of the pixel circuit. In addition, the first reference current and the first reference time used for detecting the over-current in the power-on monitoring period may be adjusted in consideration of conditions such as an expected magnitude of the over-current and durability of internal circuits against the over-current. Accordingly, the method of FIG. 8 may detect a minute over-current (e.g., due to a burnt defect, etc.) caused by the initialization voltage under a relatively low reference current condition in the power-on monitoring period.

Meanwhile, as shown in FIG. 10, in the performing of the second over-current protecting operation in the initialization operation period of the pixel circuit, the method of FIG. 10 may include monitoring the initialization voltage current caused by the initialization voltage (S310) and determining whether a state in which the initialization voltage current is greater than a second reference current continues for a second reference time (S320, S330). Here, the method of FIG. 10 may include determining the initialization voltage current as the over-current when the state in which the initialization voltage current is greater than the second reference current continues for the second reference time (S340). In this case, the method of FIG. 10 may include shutting down the display device (S350). Meanwhile, the method of FIG. 10 may include not determining the initialization voltage current as the over-current when the state in which the initialization voltage current is greater than the second reference current does not continue for the second reference time. Here, the second reference current used for detecting the over-current in the initialization operation period of the pixel circuit may be set to be greater than the first reference current used for detecting the over-current in the power-on monitoring period. In addition, the second reference current and the second reference time used for detecting the over-current in the initialization operation period of the pixel circuit may be adjusted in consideration of conditions such as an expected magnitude of the over-current and durability of internal circuits against the over-current. Accordingly, the method of FIG. 10 may detect the over-current (e.g., due to a short-circuit defect, etc.) caused by the initialization voltage without an error under a relatively high reference current condition in the initialization operation period of the pixel circuit.

Figure 11:
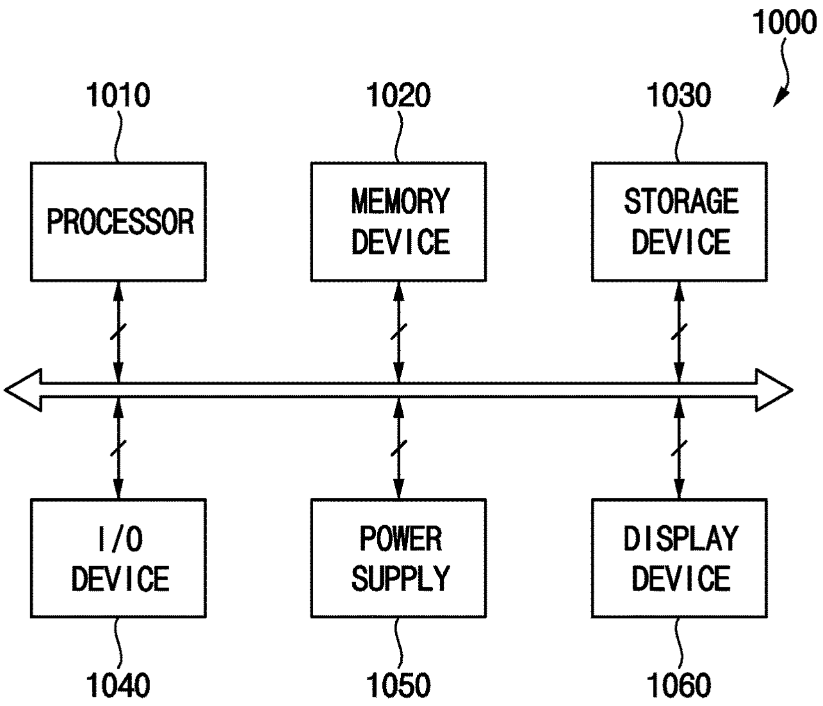
FIG. 11 is a block diagram illustrating an electronic device according to embodiments.
Figure 12:
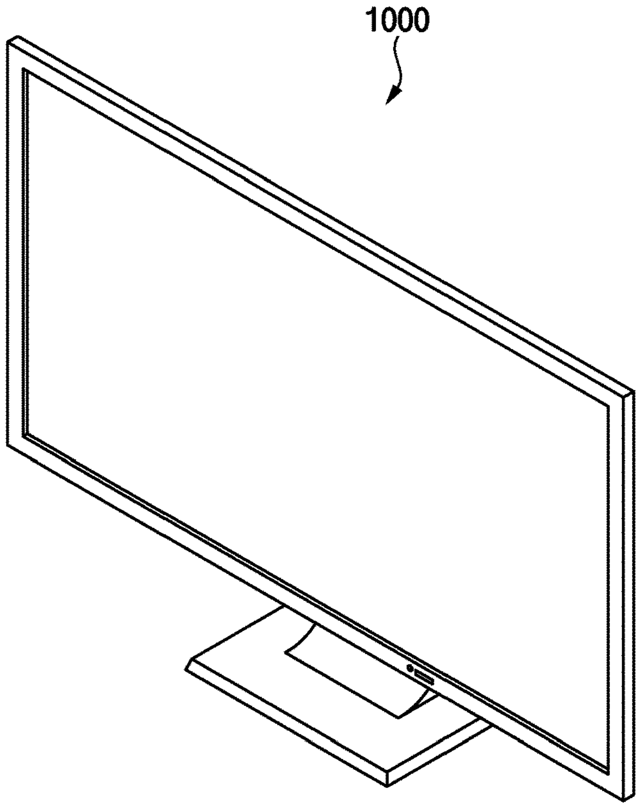
FIG. 12 is a diagram illustrating an example in which the electronic device of FIG. 11 is implemented as a television.

FIG. 11 is a block diagram illustrating an electronic device according to embodiments, and FIG. 12 is a diagram illustrating an example in which the electronic device of FIG. 11 is implemented as a television.

Referring to FIGS. 11 and 12, the electronic device 1000 may include a processor 1010, a memory device 1020, a storage device 1030, an input/output (I/O) device 1040, a power supply 1050, and a display device 1060. Here, the display device 1060 may be the display device 100 of FIG. 1. In addition, the electronic device 1000 may further include a plurality of ports for communicating with a video card, a sound card, a memory card, a universal serial bus (USB) device, other electronic device, and the like. In an embodiment, as illustrated in FIG. 12, the electronic device 1000 may be implemented as a television. However, the electronic device 1000 is not limited thereto. For example, the electronic device 1000 may be implemented as a cellular phone, a video phone, a smart phone, a smart pad, a smart watch, a tablet personal computer (PC), a car navigation system, a computer monitor, a laptop, a head mounted display (HMD) device, and the like.

The processor 1010 may perform various computing functions. In an embodiment, the processor 1010 may be a microprocessor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply (or set power) 1050 may provide power for operations of the electronic device 1000. For example, the power supply 1050 may be a power management integrated circuit (PMIC).

The display device 1060 may display an image corresponding to visual information of the electronic device 1000. In an embodiment, the display device 1060 may be an organic light emitting display device. The display device 1060 may be connected to other components via the buses or other communication links. The display device 1060 may include a voltage generating circuit configured to receive an input power supply voltage when the display device is powered on, and generate display panel voltages for driving the display panel and driving circuit voltages for driving the display panel driving circuit based on the input power supply voltage and an over-current protecting circuit configured to monitor an over-current generated inside the display device, and generate a shut-down request signal for shutting down at least one of the display panel, the display panel driving circuit, and the voltage generating circuit when the over-current is detected.

Here, according to the display device 1060, the voltage generating circuit may be configured to output an initialization voltage for initializing an initialization target node in the pixel circuit at a first time point which corresponds to a time point at which the input power supply voltage is received or a time point that is later than the time point at which the input power supply voltage is received by a predetermined time, the display panel driving circuit may be configured to output a scan clock signal for generating a scan signal that is to be applied to the pixel circuit at a second time point that is later than the first time point, and the over-current protecting circuit may be configured to perform a first over-current protecting operation of detecting whether an initialization voltage current caused by the initialization voltage is the over-current in a power-on monitoring period that is set between the first time point and the second time point. In addition, according to the display device 1060, the over-current protecting circuit may perform a second over-current protecting operation of detecting whether the initialization voltage current caused by the initialization voltage is the over-current in an initialization operation period of the pixel circuit during which the initialization voltage is applied to the initialization target node in the pixel circuit when a display operation of displaying an image on the display panel is performed. As a result, the display device 1060 may detect a minute over-current (e.g., due to a burnt defect, etc.) in the power-on monitoring period, and may detect the over-current (e.g., due to a short-circuit defect, etc.) in the initialization operation period of the pixel circuit which is greater than the minute over-current without an error. Since these are described above, duplicated description related thereto will not be repeated.

The present disclosure may be applied to a display device and an electronic device including the display device. For example, the present disclosure may be applied to a cellular phone, a smart phone, a video phone, a smart pad, a smart watch, a tablet PC, a car navigation system, a television, a computer monitor, a laptop, a head mounted display (HMD) device, an MP3 player, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of the inventive concept and is not to be construed as limited to the predetermined embodiments disclosed, and that modifications to the disclosed embodiments, as well as other embodiments can be made.

What is claimed is:

1. A display device comprising:

a display panel including a pixel circuit;

a display panel driving circuit configured to drive the display panel;

a voltage generating circuit configured to receive an input power supply voltage when the display device is powered on, and generate display panel voltages for driving the display panel and driving circuit voltages for driving the display panel driving circuit based on the input power supply voltage; and an over-current protecting circuit configured to monitor an over-current generated inside the display device, and generate a shut-down request signal for shutting down at least one of the display panel, the display panel driving circuit, and the voltage generating circuit when the over-current is detected, wherein the voltage generating circuit is configured to output an initialization voltage for initializing an initialization target node in the pixel circuit at a first time point corresponding to a time point at which the input power supply voltage is received, wherein the display panel driving circuit is configured to output a scan clock signal for generating a scan signal that is to be applied to the pixel circuit at a second time point that is later than the first time point, and wherein the over-current protecting circuit is configured to perform a first over-current protecting operation of detecting whether an initialization voltage current caused by the initialization voltage is the over-current in a power-on monitoring period that is set between the first time point and the second time point.

2. The display device of claim 1, wherein the initialization target node corresponds to an anode of a light emitting element connected to the pixel circuit.

3. The display device of claim 1, wherein the power-on monitoring period is set as an entire period between the first time point and the second time point.

4. The display device of claim 1, wherein the power-on monitoring period is set as a partial period between the first time point and the second time point.

5. The display device of claim 1, wherein, in the power-on monitoring period, the over-current protecting circuit is configured to generate the shut-down request signal when a state in which the initialization voltage current is greater than a first reference current continues for a first reference time.

6. The display device of claim 5, wherein, when a display operation of displaying an image on the display panel is performed, the over-current protecting circuit is configured to perform a second over-current protecting operation of detecting whether the initialization voltage current is the over-current in an initialization operation period of the pixel circuit during which the initialization voltage is applied to the initialization target node.

7. The display device of claim 6, wherein, in the initialization operation period, the over-current protecting circuit is configured to generate the shut-down request signal when a state in which the initialization voltage current is greater than a second reference current continues for a second reference time.

8. The display device of claim 7, wherein the first reference current is set to be smaller than the second reference current.

9. The display device of claim 8, wherein the first reference current, the second reference current, the first reference time, and the second reference time are adjustable.

10. A display device comprising:

a display panel including a pixel circuit;

a display panel driving circuit configured to drive the display panel;

a voltage generating circuit configured to receive an input power supply voltage when the display device is powered on, and generate display panel voltages for driving the display panel and driving circuit voltages for driving the display panel driving circuit based on the input power supply voltage; and an over-current protecting circuit configured to monitor an over-current generated inside the display device, and generate a shut-down request signal for shutting down at least one of the display panel, the display panel driving circuit, and the voltage generating circuit when the over-current is detected, wherein the voltage generating circuit is configured to output an initialization voltage for initializing an initialization target node in the pixel circuit at a first time point that is later than a time point at which the input power supply voltage is received, wherein the display panel driving circuit is configured to output a scan clock signal for generating a scan signal that is to be applied to the pixel circuit at a second time point that is later than the first time point, and wherein the over-current protecting circuit is configured to perform a first over-current protecting operation of detecting whether an initialization voltage current caused by the initialization voltage is the over-current in a power-on monitoring period that is set between the first time point and the second time point.

11. The display device of claim 10, wherein the initialization target node corresponds to an anode of a light emitting element connected to the pixel circuit.

12. The display device of claim 10, wherein the power-on monitoring period is set as an entire period between the first time point and the second time point.

13. The display device of claim 10, wherein the power-on monitoring period is set as a partial period between the first time point and the second time point.

14. The display device of claim 10, wherein, in the power-on monitoring period, the over-current protecting circuit is configured to generate the shut-down request signal when a state in which the initialization voltage current is greater than a first reference current continues for a first reference time.

15. The display device of claim 14, wherein, when a display operation of displaying an image on the display panel is performed, the over-current protecting circuit is configured to perform a second over-current protecting operation of detecting whether the initialization voltage current is the over-current in an initialization operation period of the pixel circuit during which the initialization voltage is applied to the initialization target node.

16. The display device of claim 15, wherein, in the initialization operation period, the over-current protecting circuit is configured to generate the shut-down request signal when a state in which the initialization voltage current is greater than a second reference current continues for a second reference time.

17. The display device of claim 16, wherein the first reference current is set to be smaller than the second reference current.

18. The display device of claim 16, wherein the first reference current, the second reference current, the first reference time, and the second reference time are adjustable.

19. A method of performing an over-current protecting operation of a display device, the method comprising:

receiving an input power supply voltage when the display device is powered on;

generating and outputting an initialization voltage for initializing an initialization target node within a pixel circuit based on the input power supply voltage;

performing a first over-current protecting operation of detecting whether an initialization voltage current caused by the initialization voltage is an over-current in a power-on monitoring period that is set between a first time point at which the initialization voltage is output and a second time point at which a scan clock signal for generating a scan signal that is to be applied to the pixel circuit is output; and shutting down the display device when the initialization voltage current is determined as the over-current in the power-on monitoring period.

20. The method of claim 19, wherein the initialization target node corresponds to an anode of a light emitting element connected to the pixel circuit.

21. The method of claim 19, further comprising:

applying the initialization voltage to the initialization target node in an initialization operation period of the pixel circuit after the second time point;

performing a second over-current protecting operation of detecting whether the initialization voltage current is the over-current in the initialization operation period; and shutting down the display device when the initialization voltage current is determined as the over-current in the initialization operation period.

22. The method of claim 21, wherein performing the first over-current protecting operation includes:

monitoring the initialization voltage current;

determining whether a first state in which the initialization voltage current is greater than a first reference current continues for a first reference time; and determining the initialization voltage current as the over-current when the first state continues for the first reference time.

23. The method of claim 22, wherein performing the second over-current protecting operation includes:

monitoring the initialization voltage current;

determining whether a second state in which the initialization voltage current is greater than a second reference current continues for a second reference time; and determining the initialization voltage current as the over-current when the second state continues for the second reference time.

24. The method of claim 23, wherein the first reference current is set to be smaller than the second reference current.

25. The method of claim 24, wherein the first reference current, the second reference current, the first reference time, and the second reference time are adjustable.

* * * * *